US012638674B2

(12) United States Patent
Zhu et al.

(10) Patent No.: US 12,638,674 B2
(45) Date of Patent: May 26, 2026

(54) IMAGING ADJUSTMENT APPARATUS AND METHOD, WEARABLE DEVICE AND STORAGE MEDIUM

(71) Applicant: BOE Technology Group Co., Ltd., Beijing (CN)

(72) Inventors: Jianwen Zhu, Beijing (CN); Feng Zi, Beijing (CN); Feng Gao, Beijing (CN); Binhua Sun, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 336 days.

(21) Appl. No.: 18/276,653

(22) PCT Filed: Jul. 11, 2022

(86) PCT No.: PCT/CN2022/104878
§ 371 (c)(1),
(2) Date: Aug. 10, 2023

(87) PCT Pub. No.: WO2023/001007
PCT Pub. Date: Jan. 26, 2023

(65) Prior Publication Data
US 2024/0118539 A1 Apr. 11, 2024

(30) Foreign Application Priority Data

Jul. 23, 2021 (CN) .......................... 202110836879.3

(51) Int. Cl.
*G02B 27/00* (2006.01)
*G02B 7/04* (2021.01)

(52) U.S. Cl.
CPC ........... *G02B 27/0093* (2013.01); *G02B 7/04* (2013.01)

(58) Field of Classification Search
CPC G02B 27/0093; G02B 27/01; G02B 27/0172; G02B 27/0176; G02B 7/04;
(Continued)

(56) References Cited

U.S. PATENT DOCUMENTS

| | | |
|---|---|---|
| 5,739,797 A | 4/1998 | Karasawa et al. |
| 8,446,341 B2 * | 5/2013 | Amirparviz .......... A61B 5/6821 |
| | | 250/221 |

(Continued)

FOREIGN PATENT DOCUMENTS

| | | |
|---|---|---|
| CN | 101133942 A | 3/2008 |
| CN | 102885607 A | 1/2013 |

(Continued)

OTHER PUBLICATIONS

International Search Report for PCT/CN2022/104878 Mailed Oct. 17, 2022.

(Continued)

*Primary Examiner* — William R Alexander
(74) *Attorney, Agent, or Firm* — Ling Wu; Stephen Yang; Ling and Yang Intellectual Property

(57) ABSTRACT

An imaging adjustment apparatus (10) and method, a wearable device and a storage medium are provided. The imaging adjustment apparatus (10) includes a light-emitting device (101), a photoelectric conversion device (102), a control apparatus (103) and a drive apparatus (104), wherein the light-emitting device (101) is configured to emit first light, such that the first light irradiates eyes of a user; the photoelectric conversion device (102) is configured to perform photoelectric conversion on the basis of second light reflected by the eyes of the user to generate an electrical signal, and provide the generated electrical signal to the control apparatus (103); the control apparatus (103) is configured to determine the state of the eyes of the user on (Continued)

the basis of the electrical signal, and control, according to the state of the eyes of the user.

17 Claims, 12 Drawing Sheets

(58) Field of Classification Search
CPC .... G02B 2027/0138; G02B 2027/0178; A61B 3/028; A61B 3/10; G06F 3/01
USPC .......................................................... 359/823
See application file for complete search history.

(56) References Cited

U.S. PATENT DOCUMENTS

| | | | | |
|---|---|---|---|---|
| 8,629,815 | B2 * | 1/2014 | Brin ...................... | G02B 27/017 |
| | | | | 715/848 |
| 9,087,471 | B2 * | 7/2015 | Miao ....................... | G09G 3/003 |
| 9,171,198 | B1 * | 10/2015 | Raffle ................... | G02B 27/01 |
| 9,223,136 | B1 * | 12/2015 | Braun ..................... | G06F 3/167 |
| 2008/0055544 | A1 | 3/2008 | Nishio et al. | |
| 2010/0001926 | A1 * | 1/2010 | Amirparviz .......... | A61B 5/6821 |
| | | | | 250/221 |
| 2013/0038510 | A1 * | 2/2013 | Brin ..................... | G02B 27/017 |
| | | | | 345/8 |
| 2013/0113973 | A1 * | 5/2013 | Miao ................... | G02B 27/017 |
| | | | | 348/E5.022 |
| 2014/0111770 | A1 | 4/2014 | Ohta et al. | |
| 2016/0057339 | A1 * | 2/2016 | Raffle ................... | G02B 27/01 |
| | | | | 348/222.1 |
| 2016/0080672 | A1 * | 3/2016 | Braun ................... | G06T 19/006 |
| | | | | 348/333.01 |
| 2016/0147301 | A1 | 5/2016 | Iwasaki et al. | |
| 2018/0247119 | A1 | 8/2018 | Ryan et al. | |
| 2019/0235247 | A1 | 8/2019 | Norden | |
| 2020/0309594 | A1 | 10/2020 | Wei et al. | |

FOREIGN PATENT DOCUMENTS

| | | |
|---|---|---|
| CN | 103767672 A | 5/2014 |
| CN | 105006105 A | 10/2015 |
| CN | 105378598 A | 3/2016 |
| CN | 107656371 A | 2/2018 |
| CN | 109256042 A | 1/2019 |
| CN | 110095870 A | 8/2019 |
| CN | 110352033 A | 10/2019 |
| CN | 110727111 A | 1/2020 |
| CN | 111670001 A | 9/2020 |
| CN | 111754728 A | 10/2020 |
| CN | 112558751 A | 3/2021 |
| JP | 63-217880 A | 9/1988 |
| JP | H07244253 A | 9/1995 |
| JP | 2020006172 A | 1/2020 |
| KR | 20180066434 A | 6/2018 |

OTHER PUBLICATIONS

Office Action dated Oct. 17, 2025 for CN 202110836879.3 and English Translation.

* cited by examiner

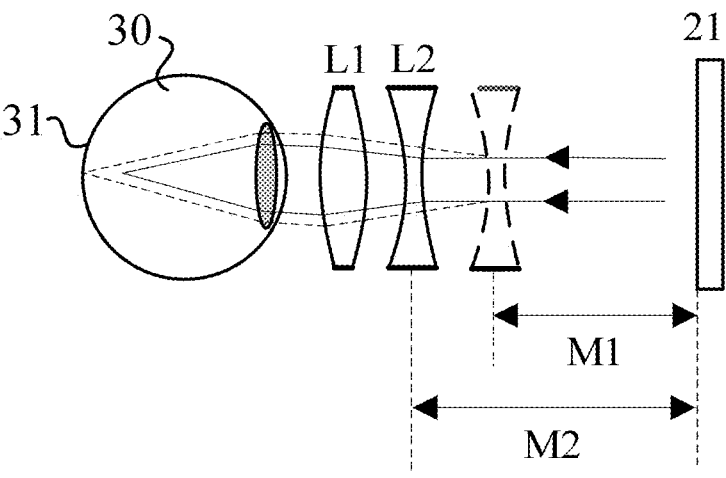

FIG. 17b

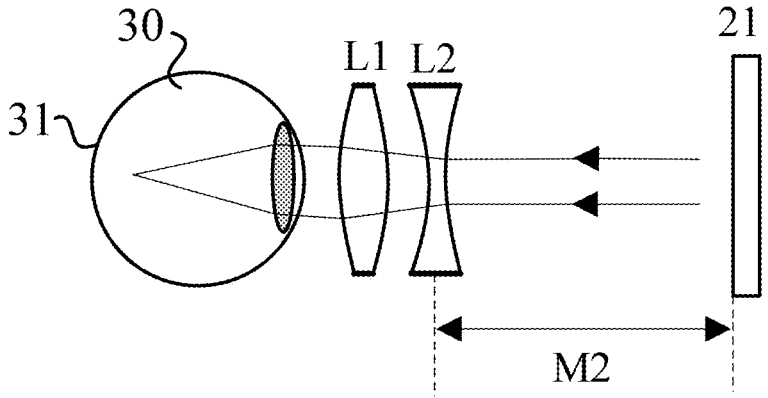

FIG. 17c

At step S1, emitting a first light to irradiate the eyes of a user at step S2, judging the eye state of the user based on the electric signal generated after photoelectric conversion of the second light, wherein the second light is the light reflected by the eye of the user after the first light irradiates the eye of the user at step S3, adjusting the position of the imaging plane of the imaging system according to the eye state of the user.

FIG. 18

IMAGING ADJUSTMENT APPARATUS AND METHOD, WEARABLE DEVICE AND STORAGE MEDIUM

CROSS-REFERENCE TO RELATED APPLICATIONS

The present application is a U.S. National Phase Entry of International Application No. PCT/CN2022/104878 having an international filing date of Jul. 11, 2022, which claims the priority of the Chinese Patent Application No. 202110836879.3 filed to the CNIPA on Jul. 23, 2021 and entitled "Imaging Adjustment Apparatus and Method, Wearable Device and Storage Medium". The above-identified applications are hereby incorporated by reference.

TECHNICAL FIELD

The embodiment of the disclosure relates to, but is not limited to, the field of smart wearable technology, in particular to an imaging adjustment apparatus and method, a wearable device and a storage medium.

BACKGROUND

With the development of science and technology, people have more and more entertainment methods. VR (Virtual Reality) technology and AR (Augmented Reality) technology are gradually applied to audio-visual entertainment, and the interest of various audio-visual entertainment equipment is greatly improved. The appearance of VR/AR eye protection instrument enables pseudomyopia patients to correct myopia while using VR or AR equipment for entertainment. Although VR/AR eye protection instrument brings good news to myopia patients, the basic version of VR/AR eye protection instrument still has defects in distance adjustment correction strategy, which greatly reduces the correction effect of VR/AR eye protection instrument.

SUMMARY

The following is a summary of subject matters described herein in detail. The summary is not intended to limit the protection scope of claims.

On one hand, the embodiment of the present disclosure provides an imaging adjustment apparatus, which is applied to adjust the imaging surface of an imaging system formed by an optical system and a user's eye, comprising a light emitting device, a photoelectric conversion device, a control apparatus and a drive apparatus; wherein the light emitting device is configured to emit a first light, so that the first light irradiates the eyes of a user; the photoelectric conversion device is configured to perform photoelectric conversion to generate an electrical signal based on the second light reflected by the eye of the user, and to supply the generated electrical signal to the control apparatus; the control apparatus is configured to determine the eye state of the user based on the electrical signal, and to control the drive apparatus to operate according to the eye state of the user; and the drive apparatus is configured to adjust the position of the imaging surface of the imaging system under the control of the control apparatus.

In some optional embodiments, the wavelength of the first light emitted by the light emitting device is within the spectral response range of the photoelectric conversion device.

In some optional embodiments, the light emitting device and the photoelectric conversion device are configured on a side of the optical imaging system to avoid blocking the optical path of the optical imaging system.

In some optional embodiments, the imaging adjustment apparatus further includes a comparison apparatus; wherein the photoelectric conversion device is configured to supply the generated electrical signal to the comparison apparatus; the comparison apparatus is arranged to compare the electric signal generated by the photoelectric conversion device with a preset electric signal, generate a comparison result signal, and send the comparison result signal to the control apparatus; and the control apparatus is configured to control the drive apparatus to operate according to the comparison result signal.

In some optional embodiments, the imaging adjustment apparatus further includes a filtering apparatus and a signal amplifying apparatus; wherein the filtering apparatus is connected with the photoelectric conversion device and the signal amplifying apparatus, and is configured to filter the electrical signal generated by the photoelectric conversion device; and the signal amplifying apparatus is connected with the filtering apparatus and the comparison apparatus, and is configured to amplify the filtered signal and then supply the amplified signal to the comparison apparatus.

In some optional embodiments, the photoelectric conversion device includes a photosensitive triode and a signal conversion resistor; wherein a collector of the photosensitive triode is connected to the signal conversion resistor, and a connection node between the photosensitive triode and the signal conversion resistor serves as an output end of the photoelectric conversion device.

In some optional embodiments, the drive apparatus includes an object distance adjustment motor; wherein the object distance adjustment motor is configured to adjust a position of the imaging lens in the optical system under the control of the control apparatus.

In some optional embodiments, the imaging adjustment apparatus further includes an eye state acquisition apparatus; wherein the eye state acquisition apparatus is configured to acquire eye state information; and the control apparatus is arranged to control the drive apparatus to operate based on the electrical signal and the eye state information.

On the other hand, the embodiment of the present disclosure further provides a wearable device, which comprises an optical system and the imaging adjustment apparatus described above, wherein the imaging adjustment apparatus is configured to adjust an imaging surface of an imaging system formed by the optical system and the user's eyes.

In some optional embodiments, the wearable device further includes a screen; wherein the display surface of the screen is oriented towards the optical system.

In some optional embodiments, the imaging adjustment apparatus adjusts the imaging surface of the imaging system by adjusting the position of the imaging lens in the optical system.

In some optional embodiments, the optical system includes a first imaging lens, a second imaging lens; wherein the first imaging lens is arranged between the eye and the second imaging lens; the second imaging lens is arranged between the first imaging lens and the screen; and the imaging adjustment apparatus is configured to adjust a position of the first imaging lens or the second imaging lens, thereby adjusting a position of an imaging surface of an imaging system formed by the optical system and the eye.

In another aspect, the embodiment of the present disclosure further provides an imaging adjustment method, which is applied to the imaging adjustment apparatus described in any one of the above embodiments, and the method comprises: emitting a first light to irradiate the eyes of a user; determining the eye state of the user based on the electric signal generated after photoelectric conversion of the second light, wherein the second light is the light reflected by the eye of the user after the first light irradiates the eye of the user; and adjusting the position of the imaging surface of the imaging system according to the eye state of the user.

In some optional embodiments, the method further comprises: setting an initial position of the imaging surface of the imaging system, wherein the initial position is matched with an initial vision of a user.

In some optional embodiments, the user eye state includes a user squinting state, a user eye opening state, and a user vision evaluation result.

In some optional embodiments, after adjusting the position of the imaging surface of the imaging system according to the eye state of the user, it further includes adjusting the position of the imaging surface according to the preset period according to the vision evaluation result.

In some optional embodiments, the setting of the initial position of the imaging surface of the imaging system includes setting the initial position of the imaging surface of the imaging system when a triggering condition is met, wherein the triggering condition includes one or more of the following.

The use duration is longer than or equal to the preset adjustment period; The time interval from the last adjustment is greater than or equal to N times of the preset adjustment period, where N≥1; The determined eye state is a preset eye state.

In some optional embodiments, the optical system includes a first imaging lens, a second imaging lens; the imaging system further includes a screen, wherein the first imaging lens is located between the screen and the user's eye, and the second imaging lens is located between the first imaging lens and the screen; The adjustment of the distance between the imaging surface of the imaging system and the eye of the user comprises: adjusting the distance between the second imaging lens and the screen.

In some optional embodiments, the adjustment of the position of the imaging surface of the imaging system according to a user's eye state includes adjusting the position of the imaging surface of the imaging system according to the user's eye state when a triggering condition is met, wherein the triggering condition includes one or more of the following. The use duration is longer than or equal to the preset adjustment period; The time interval from the last adjustment is greater than or equal to N times of the preset adjustment period, where N≥1; The determined eye state is a preset eye state.

In yet another aspect, embodiments of the present disclosure further provide a non-transient computer-readable storage medium configured to store computer program instructions, wherein, when the computer program instructions are operated, the imaging adjustment method of any one of the above may be implemented.

Other features and advantages of the embodiments of the present disclosure will be set forth in the following specification, and in part will be apparent from the specification, or may be learned by practice of the embodiments of the present disclosure. Other advantages of the embodiments of the present disclosure may be achieved and obtained through the present disclosure may be achieved and obtained through solutions described in the specification and drawings.

Other aspects may be understood upon reading and understanding the drawings and detailed description.

BRIEF DESCRIPTION OF DRAWINGS

Accompanying drawings are used for providing understanding of technical solutions of the present disclosure, and form a part of the specification. They are used for explaining the technical solutions of the present disclosure together with the embodiments of the present disclosure, but do not form a limitation on the technical solutions of the present disclosure.

FIG. 17a-FIG. 17c are schematic diagrams of another adjustment of an optical path provided by embodiments of the present disclosure.

FIG. 18 is a flowchart of an imaging adjustment method provided by an embodiment of the present disclosure.

DETAILED DESCRIPTION

Figure 1:
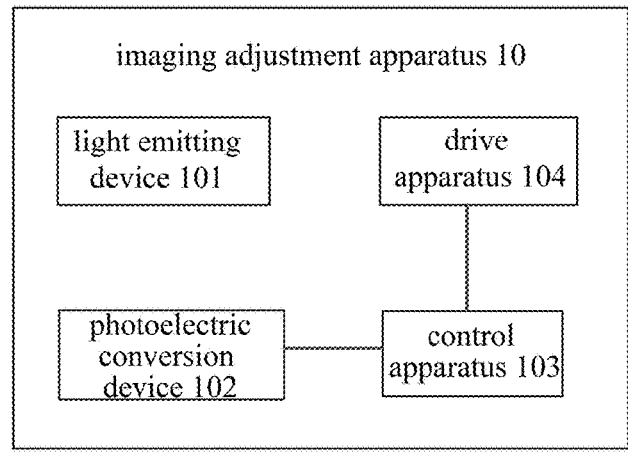
FIG. 1 is a schematic diagram of a structure of an adjustment apparatus for an imaging surface provided by an embodiment of the present disclosure.

Hereinafter embodiments of the present disclosure will be described in detail with reference to the accompanying drawings. It needs to be noted that the embodiments of the present disclosure and features in the embodiments may be randomly combined with each other if there is no conflict.

Unless otherwise defined, technical terms or scientific terms publicly used in the embodiments of the present disclosure should have usual meanings understood by those of ordinary skill in the art to which embodiments of the present disclosure belongs. "First", "second", and similar terms used in the embodiments of the present disclosure do not represent any order, quantity, or importance, but are only used for distinguishing different components, "include", "contain", or a similar word means that an element or object appearing before the word covers an element or object listed after the word and equivalent thereof and does not exclude other elements or objects.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the embodiments of the present disclosure. The positional relationships between the constituent elements may be changed as appropriate according to directions for describing the various constituent elements. Therefore, appropriate replacements may be made according to situations without being limited to the wordings described in the specification.

In the specification, unless otherwise specified and defined explicitly, terms "mount", "mutually connect", and "connect" should be understood in a broad sense. For example, it may be a fixed connection, a detachable connection or an integrated connection; it may be a mechanical connection, or may be an electrical connection; it may be a direct connection, or may be an indirect connection through a middleware, or may be an internal connection between two elements. For those ordinarily skilled in the art, meanings of the above terms in the embodiments of the present disclosure may be understood according to situations.

At present, on one hand, the correction strategy of VR or AR eye protection instrument is based on the preset distance adjustment correction strategy according to the myopia condition of patients; and on the other hand, it is based on the user's manual active adjustment. However, these two correction strategies ignore two facts. First, the myopia condition of patients is dynamically changing, and the preset distance adjustment correction strategy is no longer suitable for patients' eyes after a period of time, but will cause damage to patients' vision; and second, when patients are immersed in VR entertainment, the probability of being able to take into account the active adjustment of both eyes is very low, which makes the active adjustment strategy largely idle in practical application. Therefore, the usage comfort of users is reduced.

As shown in FIG. 1, an embodiment of the present disclosure provides an imaging adjustment apparatus 10 for adjusting an imaging surface of an imaging system formed by an optical system and a user's eyes. The imaging adjustment apparatus 10 includes a light emitting device 101, a photoelectric conversion device 102, a control apparatus 103, and a drive apparatus 104; wherein the light emitting device 101 is configured to emit a first light, so that the first light irradiates the eyes of a user; the photoelectric conversion device 102 is configured to perform photoelectric conversion to generate an electrical signal based on the second light reflected by the eyes of the user, and to supply the generated electrical signal to the control apparatus 103; the control apparatus 103 is configured to determine the eye state of the user based on the electric signal, and to control the drive apparatus to operate according to the eye state of the user; and the drive apparatus 104 is configured to adjust the position of the imaging surface of the imaging system under the control of the control apparatus 103.

The imaging adjustment apparatus provided by an embodiment of the present disclosure may determine the eye state based on the electrical signal generated by photoelectric conversion of the second light reflected by the eyes of the user, and adjust the imaging surface of the imaging system formed by an optical system and the eyes according to the eye state; the position of the imaging surface of the imaging system may be adjusted through the eye states such as squinting or opening eyes of the user, so that the vision of the user may be monitored in time and automatically, so as to adjust the position of the imaging surface in time and automatically according to the monitoring results, and to improve the comfort of the user.

Some surveys show that myopic patients will subconsciously see objects through squinting when their visual field is drawn away and the vision suddenly becomes blurred. First of all, squinting can reduce the area of external light entering the cornea, thus causing little small hole focusing; secondly, the contraction of orbicularis oculi muscle may make the eyes exert certain pressure on the cornea, forcing the cornea to change its refractive surface, thus changing the refraction angle of light entering the eyes and forming focus when the light reaching the retina. For some hyperopia patients, the vision will become blurred when their vision is drawn closer, and they will also squint subconsciously. Therefore, the user's eyesight may be monitored by monitoring the eye state of the user's eyes opening or squinting, or the user's use comfort may be monitored. When the user squints, it means that the current imaging surface position is not suitable and the user is uncomfortable, and when the user opens his eyes, it means that the current imaging surface position is suitable, which is relatively more comfortable for the user.

Tests show that the reflective ability of human eyelids is stronger than that of eyeball surface. Therefore, when the user squints, the intensity of the second light formed by the reflection of the first light irradiated by the light emitting device on the eyelids will increase, and after the light intensity of the second light received by the photoelectric conversion device increases, the electrical signal generated by photoelectric conversion will also increase; and when the user opens his eyes, the intensity of the second light formed by the reflection of the first light irradiated by the light emitting device on the eyelid will reduce, and after the light intensity of the second light received by the photoelectric conversion device reduces, the electric signal generated by photoelectric conversion will also reduce. Based on this principle, the embodiment of the present disclosure detects the eye state of the user squinting or opening eyes according to the magnitude of the electrical signal of the photoelectric conversion device.

The imaging adjustment apparatus provided by an embodiment of the present disclosure may be applied to an position adjustment for imaging surface of an imaging system formed by glasses (such as myopia glasses, hyperopia glasses, 3D glasses, etc.), vision correction devices, head-mounted devices (such as helmets, VR eye protection instruments, AR eye protection instruments, other VR or AR devices, etc.) and eyes, but is not limited to these devices and scenes.

At present, most of the glasses have fixed degrees. When the actual degrees of eyes change and no longer match the degrees of the original lenses, users need to go to the optical shop to have re-optometry and lenses configuration, and most of the original lenses are discarded, resulting in waste of resources. After using the imaging adjustment apparatus provided by an embodiment of the present disclosure, the degree of the glasses may be adjusted by adjusting the position of the imaging surface, and the glasses don't need be reconfigured when the degree of the original lens is not fit, thereby reducing the waste of the lenses to a great extent.

In the head-mounted equipment, such as the helmet, the vision correction function is rarely provided at present, and the imaging surface adjustment apparatus provided by the embodiment of the present disclosure is arranged in the helmet, so that glasses may no longer be worn, and the vision may be monitored and corrected in real time.

In an exemplary embodiment, the eye state includes an eye opening state, a squinting state, or the eye state is a user vision evaluation result.

In the embodiment of the present disclosure, the user vision evaluation result may be a result obtained by evaluating the user vision by the imaging adjustment apparatus 10, and the vision evaluation result may be a user vision limit obtained according to the monitored eye state of the user, which may be referred to a later imaging adjustment method and will not be described in detail here.

According to the imaging adjustment apparatus provided in the embodiment of the present disclosure, the imaging surface of the imaging system formed by the optical system and the eyes is adjusted by the imaging adjustment apparatus 10 according to the eye state of the user, so that the imaging system formed by the eyes and the optical system may be adjusted in time and automatically, and the user's usage comfort may be improved. Embodiments of the present disclosure may be used to correct the vision of a user.

According to an application scenario of an embodiment of the present disclosure, the position of an imaging surface of an imaging system formed by an optical system and an eye may be adjusted in real time according to the eye opening state or squinting state of a user, so as to adapt to the current eye degree of the user. It is equivalent to monitoring and/or correcting vision in real time.

According to another application scenario of an embodiment of the present disclosure, the control apparatus 103 in the imaging adjustment apparatus 10 may set a preset time, and trigger the imaging adjustment apparatus 10 to adjust the position of the imaging surface after reaching the preset time. It is equivalent to regular vision monitoring and/or correction.

According to another application scenario of an embodiment of the present disclosure, the control apparatus 103 in the imaging adjustment apparatus 10 may set a preset time, trigger the imaging adjustment apparatus 10 to adjust the position of the imaging surface after reaching the preset time, obtain a vision evaluation result, and then adjust the position of the imaging surface according to the vision evaluation result. It is equivalent to regular visual evaluation and/or correction.

In an embodiment of the present disclosure, the drive apparatus 104 adjusts the position of the imaging surface on a side of the optical system close to the eye under the control of the control apparatus 103, so that the adjusted position of the imaging surface falls on the retina of the eye as much as possible.

In an exemplary embodiment, the wavelength of the first light emitted by the light emitting device 101 is within the spectral response range of the photoelectric conversion device 102 so that the photoelectric conversion device 102 may perform photoelectric conversion based on the second light ray.

In an embodiment of the present disclosure, when the light emitting device 101 and the photoelectric conversion device 102 are selected, the spectral range of the light emitting device 101 and the photoelectric conversion device 102 does not fall into the spectral range of the received light when the eye observes the object and does not cause harm to the eye. For example, the spectral range of the infrared light (the wavelength range is 760 nm-1400 nm) may be selected instead of the spectral range of the visible light, for example, the wavelength of the light emitting device 101 and the response wavelength of the photoelectric conversion device are both 850 nm. In actual implementation, as long as it does not harm the eyes and avoids the spectral range of received light when observing things, how to select is not limited here.

It is not limited to select the light emitting device 101 or the photoelectric conversion device 102 herein, as long as the corresponding functions may be achieved. For example, an infrared light emitting diode may be selected to be the light emitting device 101, and a photosensitive diode or a photosensitive triode that senses infrared light may be selected to be the corresponding photoelectric conversion device 102; or an infrared light emitting triode may be selected to be the light emitting device 101 and an infrared light photosensitive diode or an infrared light photosensitive triode may be selected to be the corresponding photoelectric conversion device 102.

Figure 2:
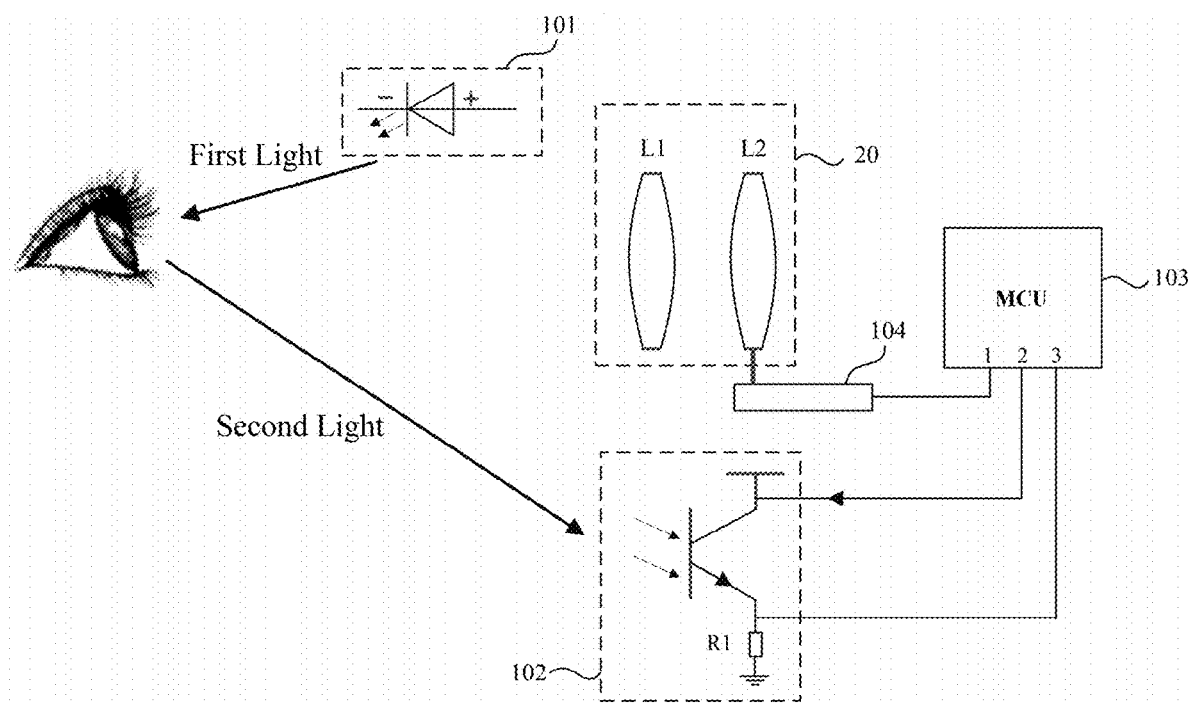
FIG. 2 is a schematic diagram of an application structure of an adjustment apparatus for an imaging surface provided by an embodiment of the present disclosure.

In an exemplary embodiment, as shown in FIG. 2, the photoelectric conversion device 102 includes a photosensitive triode and a signal conversion resistor; wherein a collector of the photosensitive triode is connected to a conversion resistor R1 of an electrical signal, and a connection node between the photosensitive triode and the signal conversion resistor R1 serves as an output of the photoelectric conversion device 102. Among them, the function of the signal conversion resistor R1 is to convert the current signal generated by the photosensitive triode through photoelectric conversion into a voltage signal.

In an embodiment of the present disclosure, the light emitting device 101 may emit light under the control of the control apparatus 103. The photoelectric conversion device 102 can perform photoelectric conversion under the control of the control apparatus 103. Another feasible implementation is to provide a first switch for controlling the photoelectric conversion device 102 to control the photoelectric conversion device 102 to perform photoelectric conversion, and to provide a second switch for controlling the light emitting device 101 to control the light emitting device 101 to emit light. Among them, the first switch and the second switch can be the same switch, and after the switch is closed, the photoelectric conversion device 102 and the light emitting device may be started simultaneously or may be arranged separately.

In an exemplary embodiment, as shown in FIG. 2, the light emitting device 101 and the photoelectric converter 102 are provided on a side of the optical system 20 to avoid blocking the optical path of the optical system 20.

FIG. 2 shows a schematic diagram of an application of the imaging adjustment apparatus 10, including a schematic diagram of the structure among the user's eyes, the optical system 20 and the imaging adjustment apparatus 10. Among them, in order to avoid blocking the transmission of the optical path between the optical system 20 and the user's eyes, the light emitting device 101 and the photoelectric conversion device 102 may be arranged at the periphery of the optical system 20, and the relative positions of the light emitting device 101 and the photoelectric conversion device 102 are not limited thereto, as long as the first light emitted by the light emitting device 101 may irradiate the user's eyes and the second light reflected by the user's eyes may irradiate the photoelectric conversion device 102.

Figure 3:
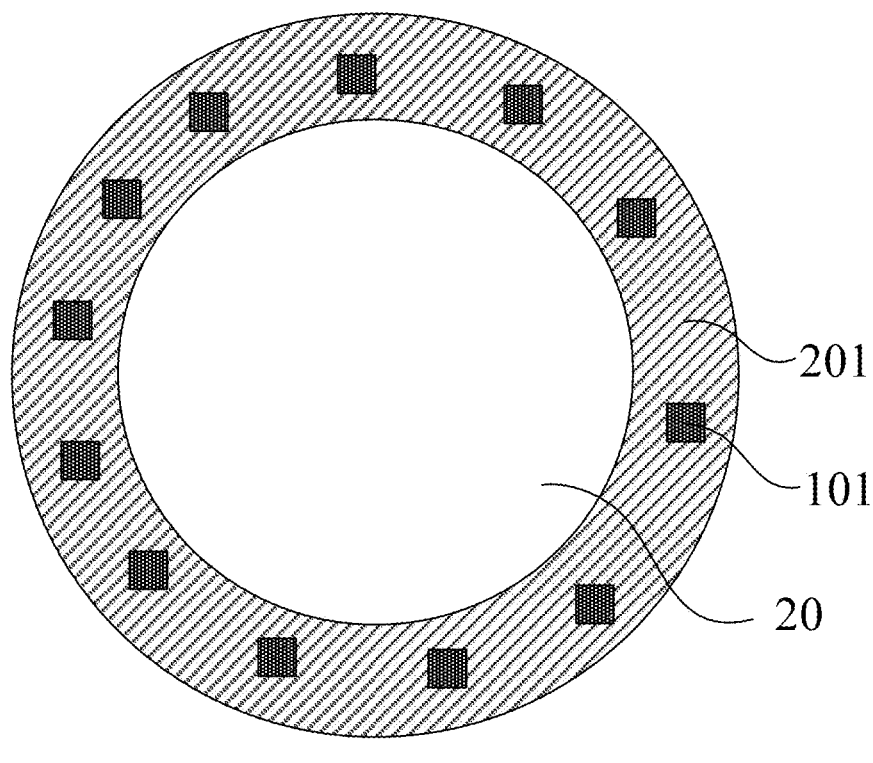
FIG. 3 is a schematic diagram of a structure of an arrangement of a light emitting device provided by an embodiment of the present disclosure.

In an embodiment of the present disclosure, in order to improve the intensity of light received by the eye of the user, a plurality of light emitting devices 101 may be provided in a peripheral region 201 of the optical system 20 and may be provided around the optical system 20. FIG. 3 is a schematic diagram of a structure in which a plurality of light emitting devices 101 are provided in a peripheral region 201 of the optical system 20.

Figure 4A:
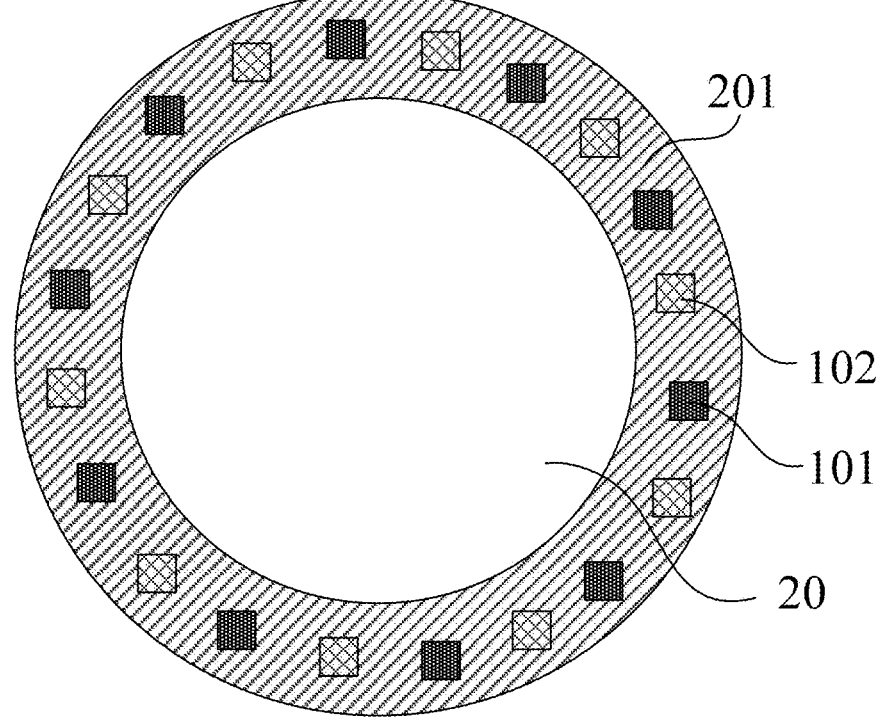
FIG. 4a-FIG. 4c are schematic diagrams of structures of arrangements of light emitting devices and photoelectric conversion devices provided by embodiments of the present disclosure.

In an embodiment of the present disclosure, one or a plurality of photoelectric conversion devices 102 may be provided, and in order to ensure that the photoelectric conversion devices 102 may better receive the formed second light reflected by the human eye, as shown in FIG. 4a, a plurality of photoelectric conversion devices 102 may be provided. A feasible implementation is shown in FIG. 4a, where a plurality of photoelectric conversion devices 102 may be provided in the peripheral region 201 of the optical system 20. Among them, the arrangement of the photoelectric conversion device 102 and the light emitting device 101 is not limited to the structure shown in FIG. 4a; and as shown in FIG. 4b and FIG. 4c, the photoelectric conversion device 102 and the light emitting device 101 may be provided at positions in regions opposite to the optical system peripheral region 201, and the arrangement of the photoelectric conversion device 102 and the light emitting device 101 is not limited as long as corresponding functions can be achieved.

Figures 4B, 4C:
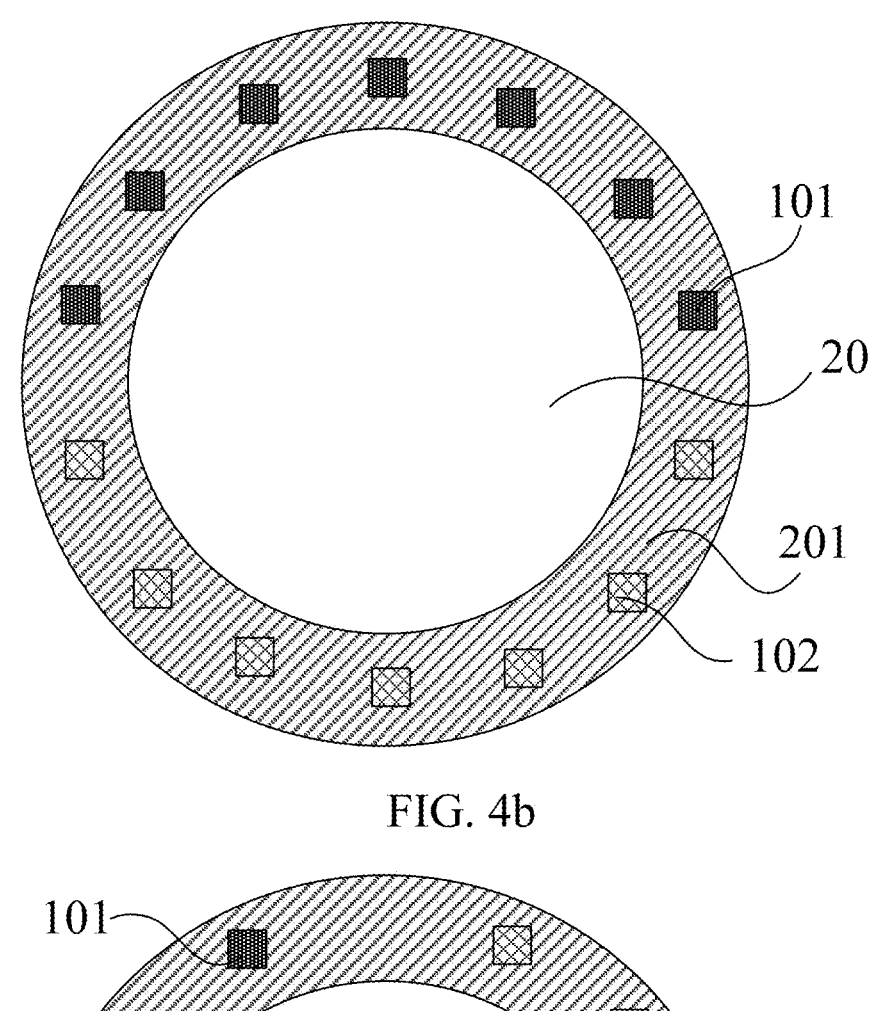

In an embodiment of the present disclosure, the photoelectric conversion device 102 and the light emitting device 101 may be arranged in the peripheral region 201 of the optical system 20 as shown in FIG. 4a-FIG. 4c, or the light emitting device 101 and the photoelectric conversion device are not limited to other apparatus provided in the periphery of the optical system 20 as long as corresponding functions may be achieved. For example, when the image adjustment apparatus 10 is applied to glasses, the photoelectric conversion device 102 and the light emitting device 101 may be provided on the frame of the glasses, as long as the optical path of the optical system 20 may be avoided from blocking and corresponding functions may be achieved at the same time.

In an embodiment of the present disclosure, the fixing manner of the optical system 20 may be set in combination with the application scene and equipment, and if the optical system 20 is applied to glasses, it may be fixed on the frame of the lens; and if the optical system 20 is applied to a wearable device, it is arranged inside the wearable device.

The positions of the drive apparatus 104 and the control apparatus 103 in an embodiment of the present disclosure are not limited, as long as the corresponding functions may be achieved and the optical path transmission is not blocked.

In an embodiment of the present disclosure, the light emitting device 101 may be connected to the control apparatus 103 and electrical energy may be supplied by the control apparatus 103 or may be supplied by other power supply devices.

Figure 5:
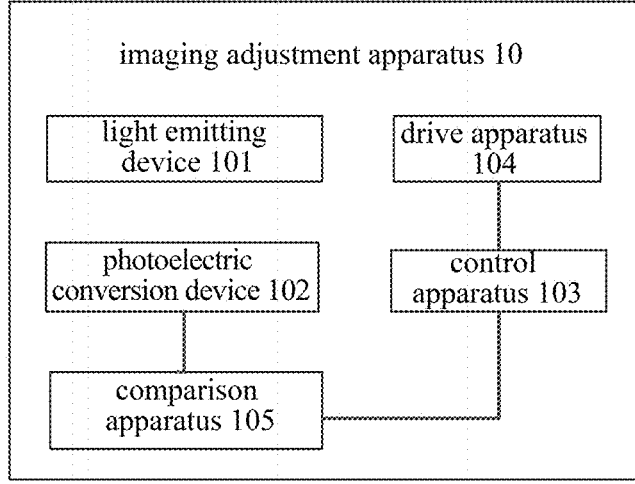
FIG. 5 is a schematic diagram of a structure of an imaging adjustment apparatus provided by an embodiment of the present disclosure.

In an exemplary embodiment, as shown in FIG. 5, the imaging adjustment apparatus 10 further includes a comparison apparatus 105; a photoelectric conversion device 101 is arranged to supply the generated electrical signal to a comparison apparatus 105; wherein the comparison apparatus 105 is arranged to compare the electric signal generated by the photoelectric conversion device 101 with a preset electric signal, generate a comparison result signal, and send the comparison result signal to a control apparatus 103; and the control apparatus 103 is arranged to control the drive apparatus 104 to operate according to the comparison result signal.

In an exemplary embodiment, in order to enhance the strength of the electrical signal output by the photoelectric conversion device 102, a signal enhancement apparatus may be provided so that the comparison apparatus 105 may accurately derive the comparison result signal.

Figure 6:
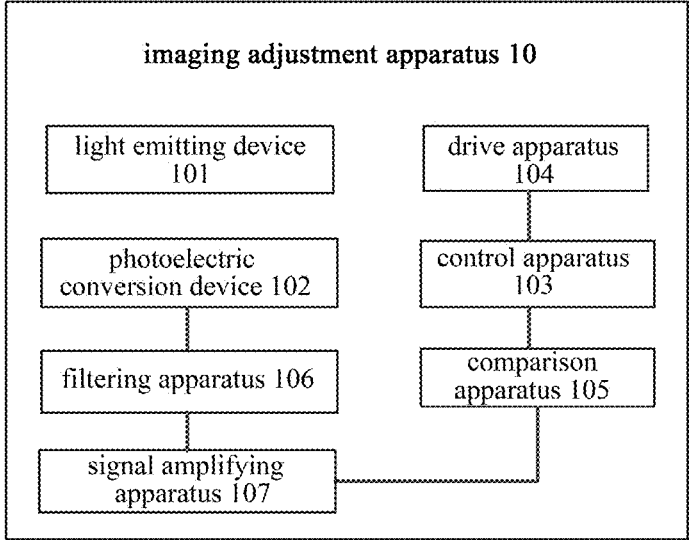
FIG. 6 is a schematic diagram of a structure of an imaging adjustment apparatus provided by an embodiment of the present disclosure.

As shown in FIG. 6, the signal enhancement apparatus may include a filtering apparatus 106 and a signal amplifying apparatus 107; wherein a filtering apparatus 106 is connected to the photoelectric conversion device 102 and the signal amplifying apparatus 107, and is arranged to filter the electrical signal generated by the photoelectric conversion device 102; and the signal amplifying apparatus 107 is connected with the filtering apparatus 106 and the comparison apparatus 105, and is arranged to amplify the filtered signal and then supply the amplified signal to the comparison apparatus 105.

In an embodiment of the present disclosure, the comparison apparatus 105, the filtering apparatus 106 and the signal amplifying apparatus 107 may employ circuits capable of achieving corresponding functions in the related art.

Figure 7:
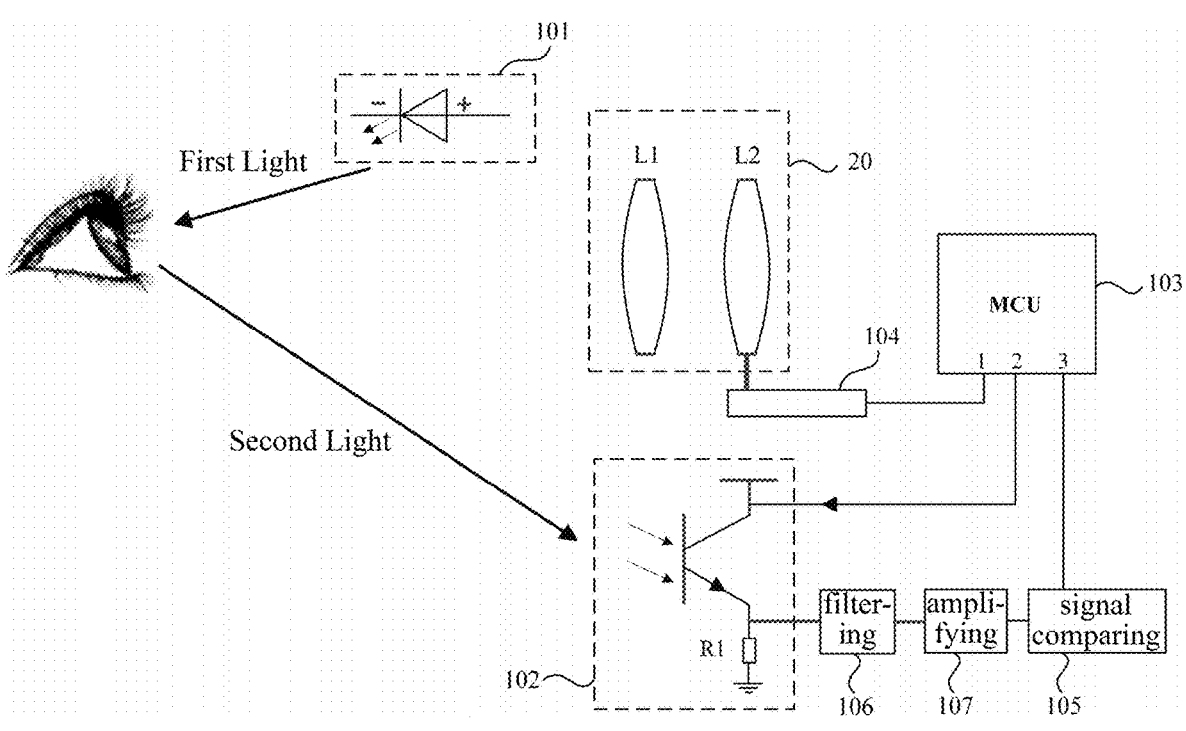
FIG. 7 is a schematic diagram of an application structure of an imaging adjustment apparatus provided by an embodiment of the present disclosure.

FIG. 7 shows a schematic diagram of another application of the imaging adjustment apparatus 10, it is a schematic diagram including another structure among the user's eyes, the optical system 20 and the imaging adjustment apparatus 10. The electrical signals outputted from the photosensitive triode of the photoelectric conversion device 102 are sequentially filtered by a filtering apparatus 106, amplified by a signal amplifying apparatus 107, and then compared by a comparison apparatus 105, and a comparison result signal is output to a control apparatus 103. For example, if the voltage signal outputted by the photosensitive triode in the photoelectric conversion device 102, which is filtered and amplified, outputted to the comparison apparatus 105 is higher than a preset electrical signal, the comparison result signal outputted by the comparison apparatus 105 to the control apparatus 103 is a high level signal (logic value 1); If the voltage signal outputted from the photosensitive triode, which is filtered and amplified, outputted to the comparison apparatus 105 is lower than a preset electrical signal, the comparison result signal outputted from the comparison apparatus 105 to the control apparatus 103 is a low level signal (logic value 0). The relationship among eye state, electrical signal (i.e. voltage in Table 1) and comparison result signal is shown in Table 1:

TABLE 1

| Eye state | Voltage (mV) | comparison result signal |
|---|---|---|
| Eye-opening state | <680 mV | 0 |
| Squinting state | ≥680 mV | 1 |

The voltage in Table 1 is a voltage that is transmitted to the control comparison apparatus after the photoelectric voltage generated by the photoelectric conversion device 102 through photoelectric conversion is filtered and amplified, and 680 mV is a preset electrical signal set by the comparison apparatus 105 (the preset electrical signal may be referred to as a threshold voltage), wherein the threshold voltage may be set according to the actual situation, and is not limited to 680 mV.

Figure 8:
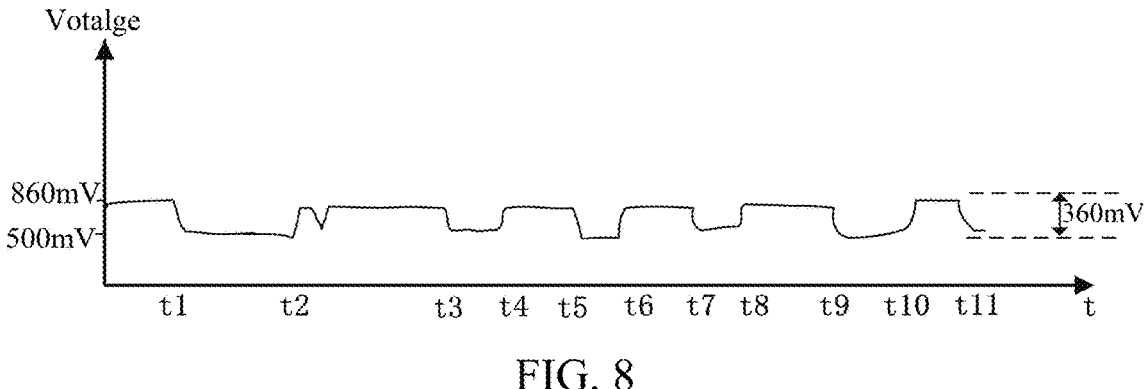
FIG. 8 is a voltage timing diagram of a photoelectric conversion device received by a comparison apparatus provided by an embodiment of the present disclosure.
Figure 9:
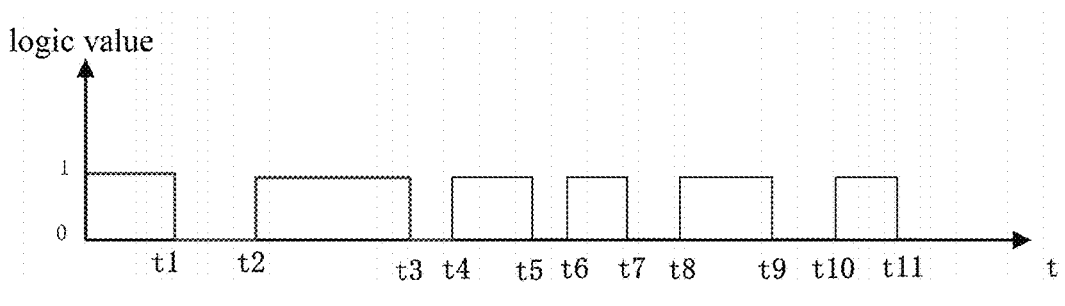
FIG. 9 is a timing diagram of a comparison apparatus outputting a level to a control apparatus provided by an embodiment of the present disclosure.

FIG. 8 shows a voltage (i.e., a voltage signal generated after photoelectric conversion by the photoelectric conversion device 102 is filtered and amplified and output to the comparison apparatus 105) based on the eye state received in different time period at the input terminal of the comparison apparatus 105, and FIG. 9 shows a logic value corresponding to the comparison result signal sent from the comparison apparatus 105 to the control device 103 at different time periods. Among them, in periods 0-t1, t2-t3, t4-t5, t6-t7, t8-t9, and t10-t11, the voltage received at the input terminal of the comparison apparatus 105 is higher than the threshold voltage, the comparison apparatus 105 generates a comparison result signal with a logic value of 1, and transmits the comparison result signal with a logic value of 1 to the control apparatus 103, which determines that the eye state of the user is a squinting state based on the comparison result signal with a logic value of 1; and in periods t1-t2, t3-t4, t5-t6, t7-t8, and t9-t10, the voltage received at the input of the comparison apparatus 105 is lower than the threshold voltage, the comparison apparatus 105 generates a comparison result signal with a logic value of 0, and transmits the comparison result signal with a logic value of 0 to the control apparatus 103, the control apparatus determines that the eye state of the user is an eye opening state based on the comparison result signal with a logic value of 0.

In an embodiment of the present disclosure, the comparator 105 may be a voltage comparator, and correspondingly, the signal obtained by the photoelectric conversion device 102 after photoelectric conversion is a voltage signal. As shown in Table 1, the comparison result signal is obtained by comparing the threshold voltage and the received voltage by the comparison apparatus 105, wherein the voltage signal obtained by the photoelectric conversion device 102 after photoelectric conversion is filtered and amplified and then output to the voltage input terminal of the comparison apparatus 105, and the threshold voltage (the preset electrical signal is the threshold voltage) input from the reference terminal of the comparison apparatus 105 is compared with the voltage received from the input terminal. When the input voltage of the comparison apparatus 105 is greater than or equal to the threshold voltage input from the reference terminal, the comparison result signal with a logic value 1 is output to the control apparatus 103, and when the voltage from input terminal of the comparison apparatus 105 is less than the threshold voltage input from the reference terminal, the comparison result signal with a logic value 0 is output to the control apparatus 103. Among them, the setting of the value of the comparison result signal is not limited to this, as long as the corresponding function may be achieved in combination with the actual scene.

In the embodiment of the present disclosure, the comparison apparatus 105 is not limited to being a voltage comparator or may be a current comparator, and the finally the value being compared is a current value; and accordingly, the photoelectric conversion device 102 outputs a current signal to the comparison apparatus 105.

Figure 10:
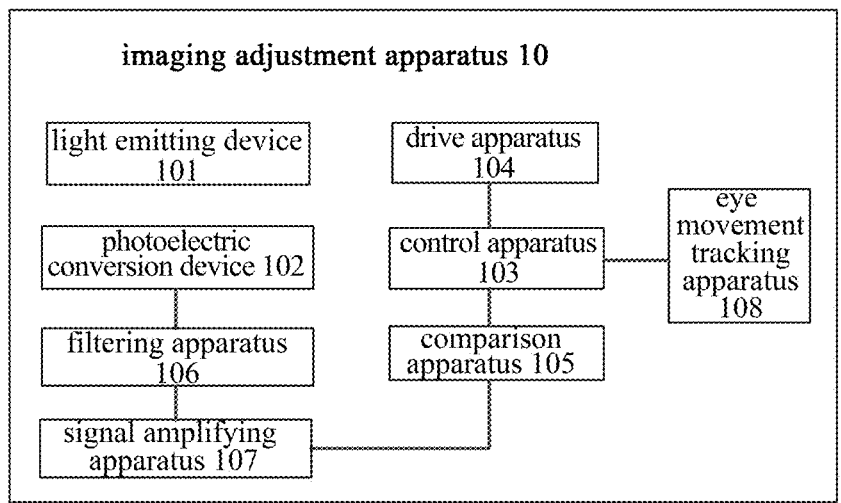
FIG. 10 is a schematic diagram of a structure of an imaging adjustment apparatus provided by an embodiment of the present disclosure.

In an exemplary embodiment, as shown in FIG. 10, the imaging adjustment apparatus may include an eye state acquisition apparatus; wherein the eye state acquisition apparatus is arranged to acquire eye state information; and the control apparatus 103 is configured to control the drive apparatus 104 to operate based on the electrical signal and the eye state information.

In an embodiment of the present disclosure, the eye state information acquired by the eye state acquisition apparatus includes eye opening state information, squinting state information, eye closing state information, blinking state information, and the like.

In an embodiment of the present disclosure, the eye state acquisition apparatus may be the eye state acquisition apparatus of the related art and will not be described in detail herein.

In an embodiment of the present disclosure, the function of the eye state acquisition apparatus is to acquire the eye state information of the user, and the control apparatus 103 may assist in determining whether the user is opening eyes or squinting based on the eye state information. For example, when a user blinks, eye state information provided by the eye state acquisition apparatus assists in determining the eye state, so that the control apparatus 103 is prevented from misjudging the blinking state as the squinting state, thereby preventing from controlling erroneously the drive apparatus 104 to execute the related operation.

In an exemplary embodiment, the above-described eye state acquisition apparatus may be a camera apparatus through which user eye state information is acquired, and the control apparatus 103 controls the drive apparatus 104 to operate based on the eye state information and the electrical signal. For example, the camera apparatus may acquire the eye state information of the user by taking pictures or recording videos.

In other embodiments of the present disclosure, the imaging adjustment apparatus 10 described above may be provided on an eye tracking apparatus of the related art, such that the eye tracking apparatus has the function of the imaging adjustment apparatus 10 described above.

In the embodiment of the present disclosure, in order to avoid misjudging the eye-closing state as the squinting state, a preset voltage can be set, and the electric signal, which is formed after conversion by photoelectric conversion device 102 of the second light reflected from the light emitting device 101 irradiating the eyes when the eye is closed, is higher than the preset voltage, it is determined that the eye is closed, not squinting. Or it can be determined whether it is squinting or closed by combining with the eye state acquisition apparatus.

In an embodiment of the present disclosure, the eye state may be determined according to the electrical signal and the duration or number of times the electrical signal received. For example, when it is determined that the squinting state is maintained for longer than a preset duration or for more than a preset number of times, it is determined that the eye state is a squinting state instead of a blinking state.

In an exemplary embodiment, the drive apparatus 104 includes an object distance adjustment motor arranged to adjust the position of the imaging lens in the optical system under the control of the control apparatus 103. As shown in FIG. 2 and FIG. 7, the object distance adjustment motor may be arranged to adjust the position of the imaging lens L2 in the optical system 20. In the configuration shown in FIG. 2 and FIG. 7, the object distance adjustment motor may be provided to adjust the position of the optical lens L1, which is not limited herein.

The embodiment of the present invention further provide a wearable device, comprising an optical system and an imaging adjustment apparatus 10 described in any of the above embodiments, wherein the imaging adjustment apparatus 10 is arranged to adjust an imaging surface of an imaging system formed by the optical system and a user's eye.

Figure 11:
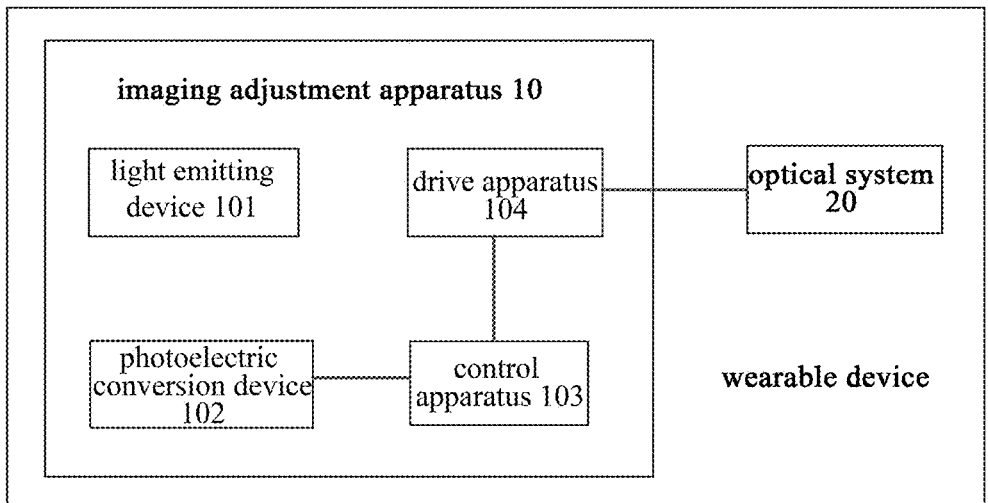
FIG. 11 is a schematic diagram of a structure of a wearable device provided by an embodiment of the present disclosure.

FIG. 11 shows an exemplary block diagram of modules of a wearable device, wherein the optical system 20 is connected to a drive apparatus 104 in the imaging adjustment apparatus 10, and may adjust the position of the imaging surface under the driving of the drive apparatus 104.

In an embodiment of the present disclosure, the wearable device may be a VR or AR device (including a VR or AR eye protection instruments), a helmet, glasses, etc.

In an embodiment of the present disclosure, the wearable device may be provided with a closed structure, such that the light emitting device may be reflected multiple times in the closed space, so that the photoelectric conversion device 102 in the imaging adjustment apparatus 10 may receive more second light in order to increase the electrical signal generated by the photoelectric conversion.

According to the wearable device provided in the embodiment of the present disclosure, the imaging surface of the imaging system formed by the optical system and the eye is adjusted by the imaging adjustment apparatus 10 according to the eye state of the user, so that the imaging system formed by the eye and the optical system may be performed distance adjustment and focus adjustment in time and automatically, and the user's usage comfort may be improved. Embodiments of the present disclosure may be used to correct the vision of a user.

According to an application scenario of an embodiment of the present disclosure, the position of an imaging surface of an imaging system formed by an optical system and an eye may be adjusted in real time according to the eye opening or squinting state of a user, so as to adapt to the current eye degree of the user. It is equivalent to monitoring and/or correcting vision in real time.

According to another application scenario of an embodiment of the present disclosure, the control apparatus 103 in the imaging adjustment apparatus 10 may set a preset time, and trigger the imaging adjustment apparatus 10 to adjust the position of the imaging surface after reaching the preset time. It is equivalent to regular vision monitoring and/or correction.

According to another application scenario of an embodiment of the present disclosure, the control apparatus 103 in the imaging adjustment apparatus 10 may set a preset time, trigger the imaging adjustment apparatus 10 to adjust the position of the imaging surface after reaching the preset time, obtain a vision evaluation result, and then adjust the position of the imaging surface according to the vision evaluation result. It is equivalent to regular visual evaluation and/or correction.

Figure 12:
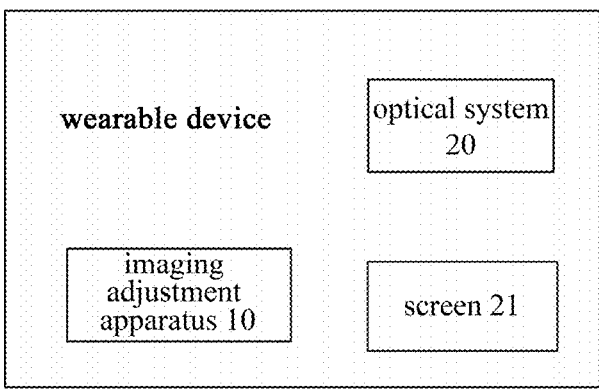
FIG. 12 is a schematic diagram of a structure of a wearable device provided by an embodiment of the present disclosure.

In an exemplary embodiment, as shown in FIG. 12, the wearable device may include a screen 21; wherein the display surface of the screen is oriented towards the optical system.

In an exemplary embodiment, the screen 21 is arranged on a side of the optical system 20 facing away from the eye of the wearable device wearer.

Figure 13:
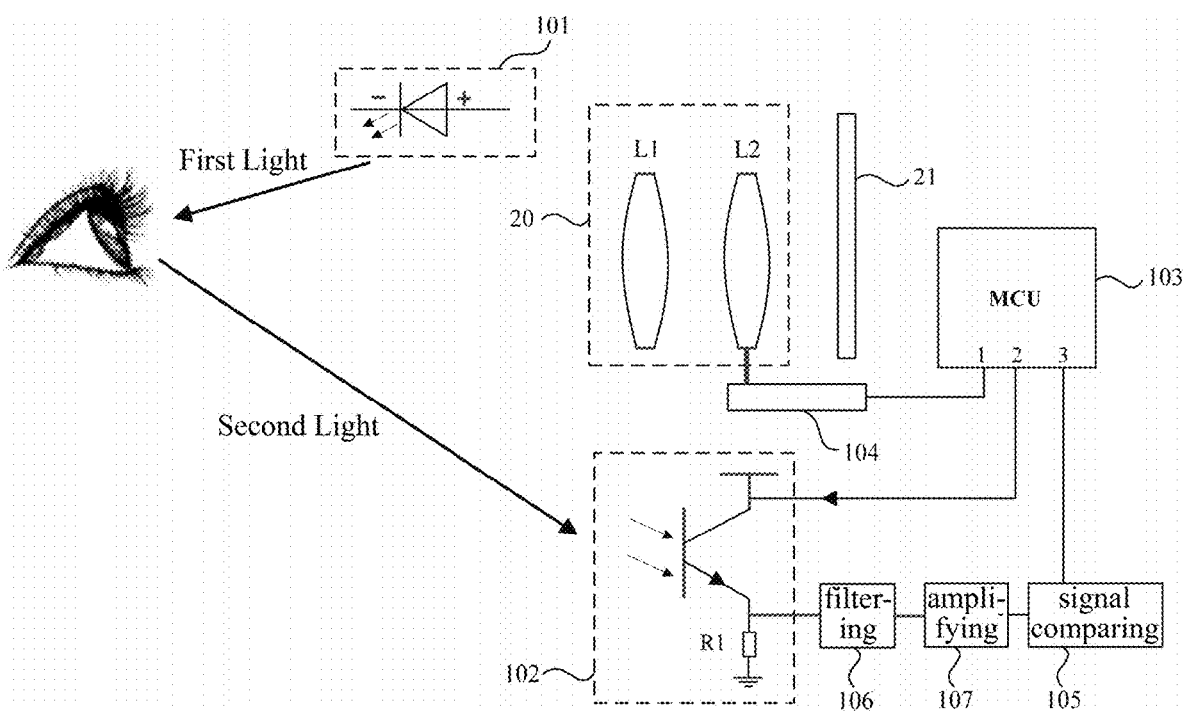
FIG. 13 is a schematic diagram of an application structure of a wearable device provided by an embodiment of the present disclosure.

FIG. 13 shows a schematic diagram of an application scenario of a wearable device, wherein a picture displayed on the screen 21 enters the eye of a wearable device wearer through the optical system 20. With the configuration shown in FIG. 13, the fixing manner of the screen 21 may be arranged in combination with an actual application scenario as long as the function can be achieved, and is not limited herein.

In an exemplary embodiment, the imaging adjustment apparatus 10 implements adjusting the position of an imaging surface on the eye side of an imaging system formed by an eye and an optical system 20 by adjusting the position of an imaging lens in the optical system 20.

Figure 14A:
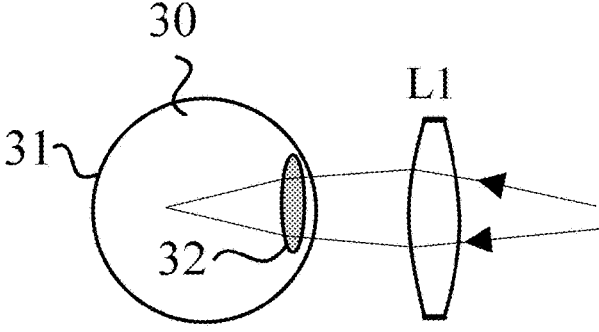
FIG. 14a-FIG. 14c are schematic diagrams of an adjustment of an optical path provided by embodiments of the present disclosure.
Figure 14B:
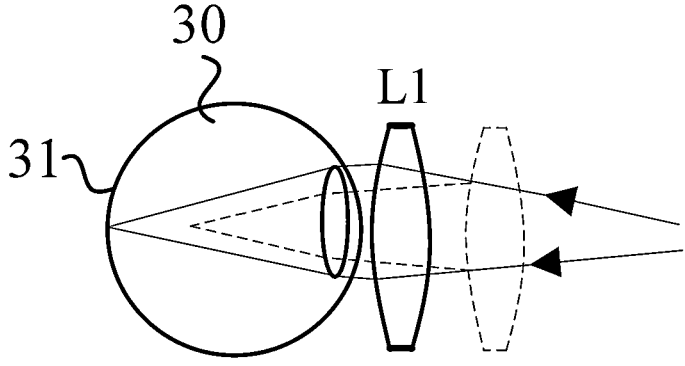
Figure 14C:
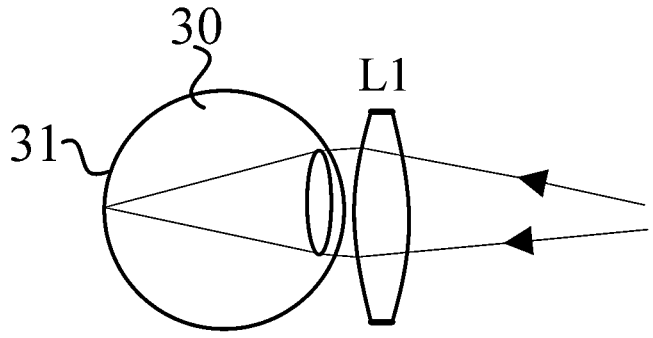

FIG. 14a, FIG. 14b and FIG. 14c shows an imaging adjustment diagram (i.e., the position adjustment of the imaging surface), and in FIG. 14a-FIG. 14c, the optical system 20 includes an imaging lens L1, wherein reference number 30 represents the eyeball, reference number 31 represents the retina and reference number 32 represents the lens. In FIG. 14a, the converging intersection point after light passes through the lens L1 and the lens 32 falls in front of the retina 31; in FIG. 14b and FIG. 14c, when the imaging lens L1 is drawn closer to the eyeball 30, the converging intersection point after the same light passes through the imaging lens L2 and the lens 32 falls on the retina 31, wherein the dotted line in FIG. 14b shows the position of the lens L1 in FIG. 14a and the light propagation path, and for the sake of clarity, FIG. 14c is a schematic diagram of an optical path after removing the lens and the light propagation path in the dotted line in FIG. 14b. It can be seen from this that by adjusting the position of the imaging lens (such as the imaging lens L1) in the optical system 20, it is possible to adjust the position of the imaging surface of the object close to the eye side through the imaging system formed by the optical system 20 and the eyes, so that the position of the imaging surface can fall on the retina of the eye as much as possible.

Figure 15A:
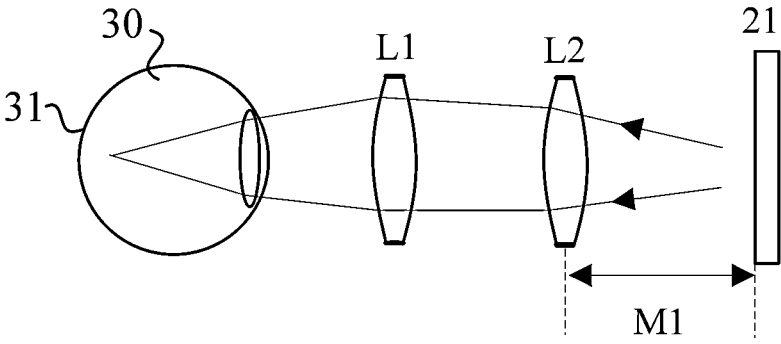
FIG. 15a-FIG. 15c are schematic diagrams of another adjustment of an optical path provided by embodiments of the present disclosure.
Figure 15B:
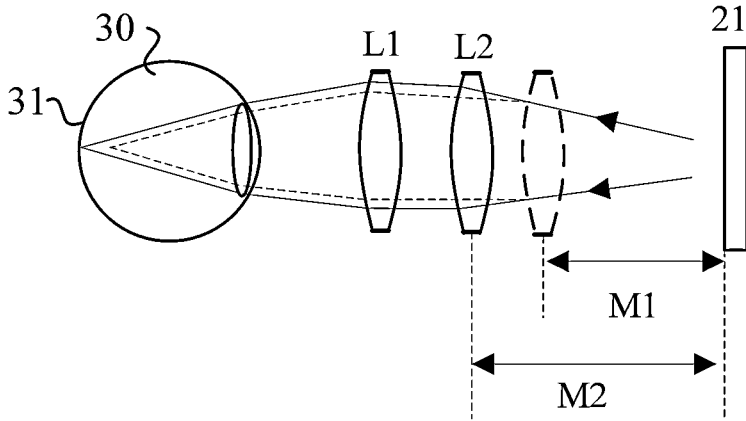
Figure 15C:
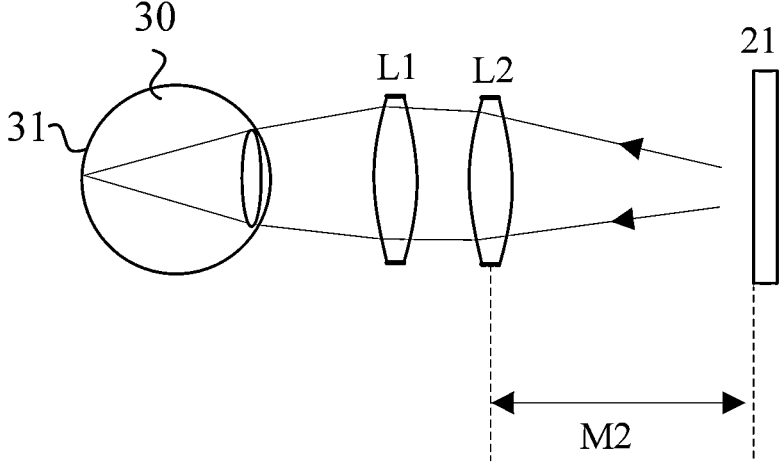

As shown in FIG. 15a-FIG. 15c, the optical system 20 may include two imaging lenses L1 and L2, and the position of the imaging surface of the imaging system formed by the optical system 20 and the eye may be adjusted by adjusting the distance M between the imaging lens L2 or L1 and the screen 21. FIG. 15a-15c are schematic diagrams in which only the position of the imaging lens L2 is adjusted while the position of the imaging lens L1 is kept unchanged, wherein the drive apparatus 104 in the imaging adjustment apparatus 10 adjusts the distance between the imaging lens L2 and the screen 21 under the control of the control apparatus 103 to adjust the position of the imaging surface of the imaging system. Among them, FIG. 15b is a schematic diagram of the optical path transmission after the distance between the imaging lens L2 and the screen 21 in FIG. 15a is adjusted from M1 to M2, wherein the dotted line in FIG. 15b corresponds to the position of the imaging lens L2 and the light propagation path in FIG. 15a, and FIG. 15c is a schematic diagram of the optical path in which the dotted line in FIG. 15b is removed. In practical applications, the drive apparatus 104 may either adjust the position of the imaging lens L1 or simultaneously adjust the positions of the imaging lenses L1 and L2, and the arrangement method is not limited herein, as long as an established function may be achieved.

Figure 16A:
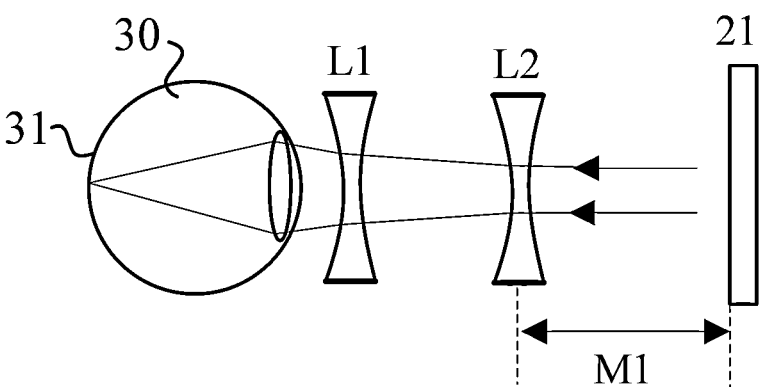
FIG. 16a-FIG. 16c are schematic diagrams of another adjustment of an optical path provided by embodiments of the present disclosure.
Figure 16B:
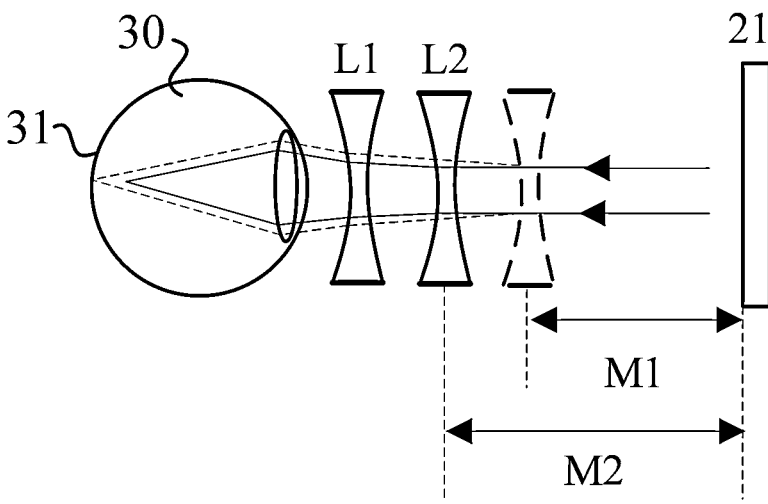
Figure 16C:
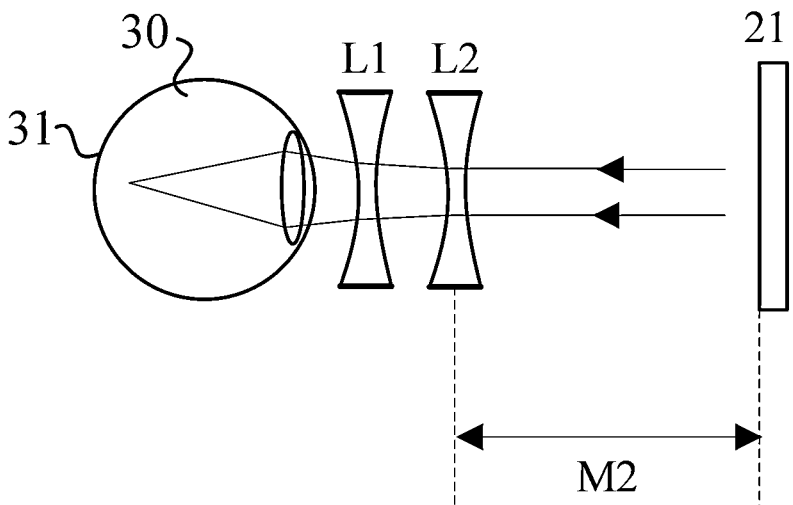
Figure 17A:
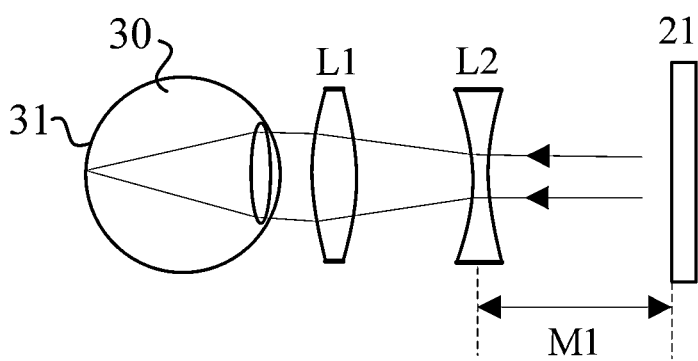

In an embodiment of the present disclosure, the quantity of imaging lenses in the optical system 20 is not limited to one or both as in FIGS. 14-15, and a plurality may be provided according to actual needs. The imaging lens in the optical system 20 is not limited to a convex lens, and a concave lens (as shown in FIG. 16a-FIG. 16c) or a combination of the concave lens and the convex lens (as shown in FIG. 17a-FIG. 17c) may be provided according to actual needs, which is not limited herein, as long as the corresponding function can be achieved. When there are a plurality of lenses, the positions of one or more of the lenses may be adjusted according to actual needs, which is not limited here.

In an exemplary embodiment, the optical system includes a first imaging lens, a second imaging lens; wherein the first imaging lens is arranged between the eye and the second imaging lens; the second imaging lens is arranged between the first imaging lens and the screen 21; and the imaging adjustment apparatus 10 is arranged to adjust a position of the first imaging lens or the second imaging lens, thereby adjusting a position of an imaging surface of an imaging system formed by the optical system and the eye.

Referring to FIG. 15-FIG. 17, the first imaging lens is L1 and the second imaging lens is L2, and the imaging adjustment apparatus 10 adjusts the position of the imaging surface of the imaging system by adjusting the position of the second imaging lens L2.

An embodiment of that invention further provide an imaging adjustment method, applied to adjusting an imaging surface of an imaging system formed by an optical system and a user's eye, as shown in FIG. 18, including: In step S1, emitting a first light to irradiate the eyes of a user; In step S2, determining the eye state of the user based on the electric signal generated after photoelectric conversion of the second light, wherein the second light is the light reflected by the eye of the user after the first light irradiates the eye of the user; and In step S3, adjusting the position of the imaging surface of the imaging system according to the eye state of the user.

The imaging adjustment method provided by the embodiment of the present disclosure may be applied to the above imaging adjustment apparatus or to the wearable device described above. The structural schematic diagrams of the imaging adjustment apparatus and the wearable device and the imaging surface adjustment schematic diagrams are shown with reference to FIG. 1-FIG. 17, and will not be repeated here.

The imaging adjustment method provided by the embodiment of the present disclosure may determine the eye state based on the electrical signal generated by photoelectric conversion of the second light reflected by the eye of the user, and adjust the imaging surface of the imaging system formed by the optical system and the eye according to the eye state; according to the user's eye state, the user's vision may be monitored in real time, and the position of the imaging surface of the imaging system may be adjusted by eye state of squinting and opening eyes, which may automatically adjust the distance or focus in real time and bring better experience to the user.

In an embodiment of the present disclosure, a user's eye state is determined based on an electrical signal, and a position of the imaging surface of the imaging system is adjusted according to the user's eye state. An optional embodiment is to determine the user's eye state based on the electrical signal, and adjust the position of one or more imaging lenses in the optical system according to the user's eye state, thereby adjusting the position of the imaging surface of the imaging system.

In some optional embodiments, the adjustment of the position of the imaging surface of the imaging system according to a user's eye state includes adjusting the position of the imaging surface of the imaging system according to the user's eye state when a triggering condition is met, wherein the triggering condition includes one or more of the following.

The usage duration is longer than or equal to the preset adjustment period; The time interval from the last adjustment is greater than or equal to N times of the preset adjustment period, where N≥1; The determined eye state is a preset eye state. For example, the preset eye state is a squinting state.

In an exemplary embodiment, the user eye state includes a user squinting state, a user eye opening state, and a user vision evaluation result.

In an exemplary embodiment, after adjusting the position of the imaging surface of the imaging system according to the eye state of the user, the method further includes adjusting the position of the imaging surface according to the preset period according to the vision evaluation result. Among them, a vision evaluation result may be obtained when the position of the imaging surface of the imaging system is adjusted according to the eye state of the user, and a correction strategy may be adjusted subsequently according to the vision evaluation result, and vision correction may be carried out automatically and in real time according to the adjusted correction strategy, which may be convenient to carry out vision correction in real time and automatically on the basis of improving the comfort of the user.

In embodiments of the present disclosure, according to the visual evaluation result, the position of the imaging surface is adjusted according to the preset period, which can avoid eye fatigue and improve comfort. For example, the preset period is 30 minutes or 10 minutes, and the position of the imaging surface may be adjusted by adjusting the position of the imaging lens in the imaging system.

In an exemplary embodiment, the imaging adjustment method further includes: setting an initial position of the imaging surface of the imaging system, wherein the initial position is a position matched with an initial vision of a user.

In an embodiment of the present disclosure, setting the initial position of the imaging surface of the imaging system is equivalent to initializing the position of the imaging surface. An optional method is to adjust the position of one or more imaging lenses among the optical lenses to an initial position, which may match the position of the user's initial vision lens.

In an exemplary embodiment, the setting of the initial position of the imaging surface of the imaging system includes setting the initial position of the imaging surface of the imaging system when a triggering condition is met, wherein the triggering condition includes one or more of the following.

The use duration is longer than or equal to the preset adjustment period; The time interval from the last adjustment is greater than or equal to N times of the preset adjustment period, where N≥1; The determined eye state is a preset eye state. For example, the preset eye state is a squinting state.

In an embodiment of the present disclosure, the visual limit of the user or the results of visual evaluation result may be obtained according to the position of the imaging lens corresponding to the monitored preset eye state.

In an exemplary embodiment, the optical system includes a first imaging lens, a second imaging lens; the imaging system further includes a screen, wherein the first imaging lens is located between the screen and the user's eye, and the second imaging lens is located between the first imaging lens and the screen; adjusting the distance between the imaging surface of the imaging system and the eye of the user includes adjusting the distance between the second imaging lens and the screen.

In an embodiment of the present disclosure, adjusting the distance between the second imaging lens and the screen may be to move the second imaging lens in units of a preset diopter to adjust the distance between the second imaging lens and the screen.

Among them, the preset diopter may be myopia diopter or hyperopia diopter. Taking myopia diopter as an example, if the preset diopter is 0.01 D (Diopter is a unit of measurement of the refractive power of a lens, the full English name is Dioptre, D for short), that is, the adjustment degree of moving once is 0.01 D. The distance between the second imaging lens and the screen is referred to as the object distance for short. Table 2 shows the relationship between myopia diopter and object distance adjustment:

TABLE 2

| Object distance M/mm | Myopic diopter |
| --- | --- |
| 3.4 | 0.2D. |
| 3.5 | 0.3D. |
| 3.7 | 0.7D. |
| 4.0 | 1D. |
| 4.8 | 2D. |
| 5.6 | 3D. |
| 6.3 | 4D. |
| 10.1 | 10D. |

In Table 2, when the object distance M is 3.4 mm, the corresponding myopia diopter is 0.2 D, that is, Table 2 can be understood as the corresponding relationship between myopia diopter and object distance. When actually adjusting the object distance, according to the corresponding relationship between the object distance and myopia diopter, the object distance may be converted into the corresponding diopter value, or the diopter may be converted into the corresponding object distance.

In an embodiment of the present disclosure, the screen picture distance may be adjusted according to the relationship among the screen picture distance, the object distance M and the myopia diopter, wherein, the adjustment relationship among the object distance M, the screen picture distance and the myopia diopter is shown in Table 3.

TABLE 3

| Object distance M/mm | Screen picture distance/mm | Myopic diopter |
| --- | --- | --- |
| 3.4 | 5000 | 0.2D. |
| 3.5 | 3000 | 0.3D |
| 3.7 | 1500 | 0.7D |
| 4.0 | 1000 | 1D |
| 4.8 | 500 | 2D |
| 5.6 | 330 | 3D |
| 6.3 | 250 | 4D |
| 10.1 | 100 | 10D |

In an embodiment of the present disclosure, the object distance and the screen picture distance may be adjusted according to the adjustment relationship of the object distance M, the screen picture distance and the myopia diopter in Table 3, such as adjusting the screen picture distance and the object distance M in the VR or AR eye protection instrument. When playing VR picture, on the basis of variable distance adjustment, the picture may be pulled away or pulled back strategically in a timely manner, and the user's vision limit may be tested according to whether squinting action is detected, so as to determine the user's vision improvement, and then adjust the distance adjustment correction strategy in real time.

In one implementation, Tables 2 and 3 correspond to the adjustment relationships of the imaging system of FIG. 15a-FIG. 15c.

Because squinting action will make the eye reflection change, the squinting or eye opening action may be effectively recognized by using infrared light emitting device to irradiate human eyes on the hardware level, and then using photoelectric conversion device to sense the reflection change, through imaging adjustment apparatus, or building eye movement tracking circuit based on sensor on the basis of imaging adjustment apparatus, or building imaging adjustment apparatus on the basis of eye movement tracking device of related technology, or building eye state acquisition apparatus on the basis of imaging adjustment apparatus. At the software level, the corresponding feedback architecture (including vision evaluation program and distance adjustment strategy program) is designed, the dynamic adjustment strategy for the distance correction may be successfully achieved, and the feedback architecture is shown in FIG. 19.

Figure 19:
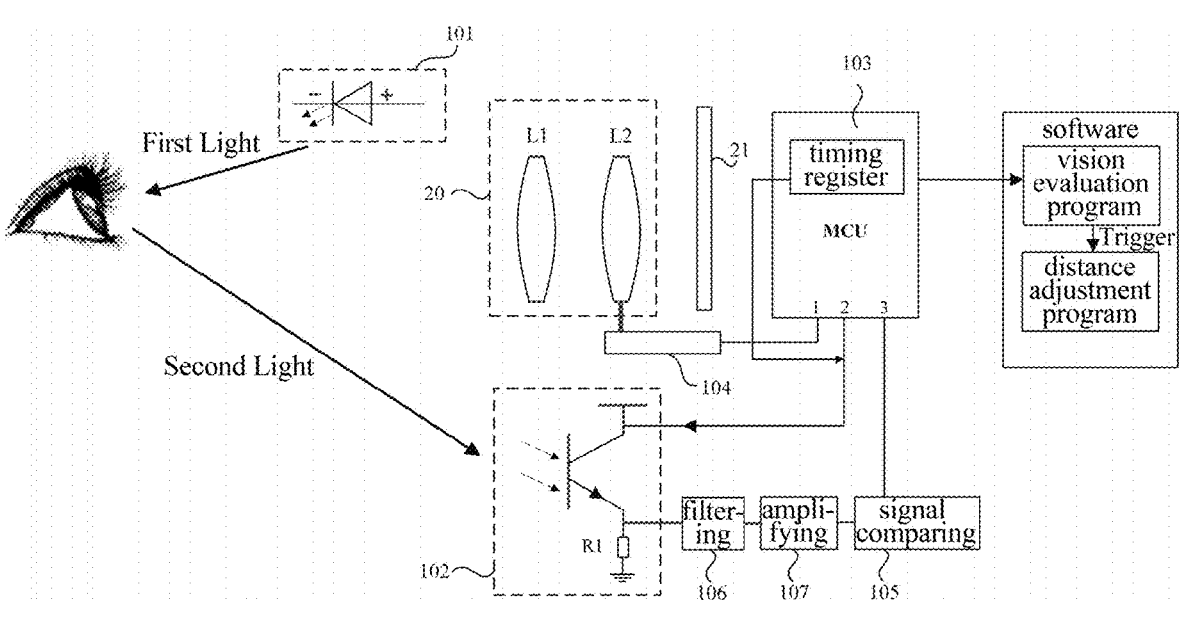
FIG. 19 is a schematic diagram of an application structure of a wearable device provided by an embodiment of the present disclosure.
Figure 20:
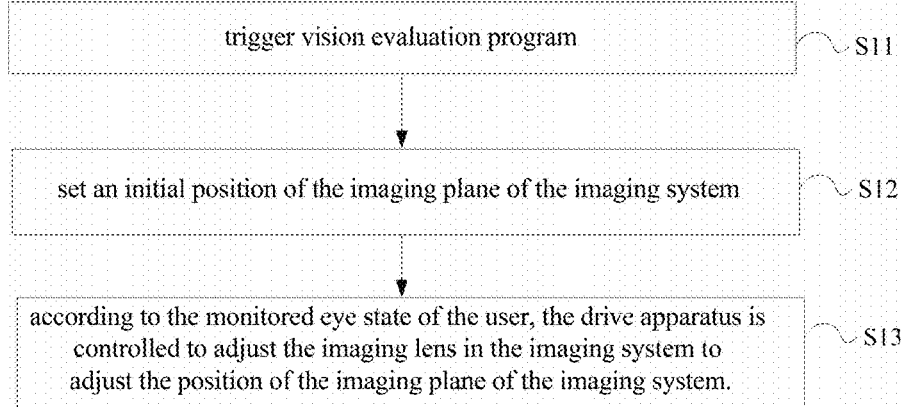
FIG. 20 is a flowchart of an imaging adjustment method provided by an embodiment of the present disclosure.

In one embodiment, as shown in FIG. 19, a control apparatus executing the above method is allocated a timing register to store timing information, and a vision evaluation program and an adjustment program of distance adjustment strategy are configured in the control apparatus. The imaging adjustment method, as shown in FIG. 20, includes:

In step S11, triggering a vision evaluation program; In step S11, when the state stored in the timing register indicates that the time has been reached, the vision evaluation program is triggered. If the user usage duration is longer than or equal to a preset adjustment period, the vision evaluation program is triggered, or if the time interval from the last adjustment is greater than or equal to N times (N≥1) of the preset adjustment period, the vision evaluation program may be triggered.

Alternatively in step S11, the vision evaluation program may be triggered when it is determined that the eye state is a squinting state based on the electrical signal.

The determination of the eye state based on the electrical signal may be based on the electrical signal and the duration or number of times for the continuous reception of the electrical signal. For example, if the relationship between the received electrical signal and the eye state is set to that the case of the electrical signal being at a high level corresponds to the eye state of squinting, then the eye state is determined to be squinting when the received electrical signal is at a high level and the number of consecutive high levels received exceeds a preset number of times or exceeds a preset length of time.

In an embodiment of the present disclosure, the preset adjustment period may be set according to actual needs, and is not limited here. For example, the preset adjustment period is 2 days, 2 months, or 2 hours.

After the vision evaluation program is triggered by the timing register in step S11, the imaging adjustment method may further include clearing the timer and entering the timing of the next cycle. Optionally, the timer can be cleared and the timing of the next cycle may be entered after the vision evaluation program is triggered when the eye state is determined to be a squinting state based on the electrical signal.

In step S12, the initial position of the imaging surface of the imaging system is set.

The step S12 includes that the vision evaluation program adjusts the object distance to a distance that matches the initial vision of the user.

In an embodiment of the present disclosure, the distance matching with the initial vision of the user may be an object distance of in the normal vision level, or an object distance initially set for a certain user, or an object distance after the last correction of the user.

In an embodiment of the present disclosure, the corresponding relationship between myopia diopter and object distance may be referred to Table 2 above, for example, the initial visual acuity is 1D, and the matching distance is 4.0 mm; and the current visual acuity is 2D, and the matching distance is 4.8 mm.

If the movement is in units of 0.01 D to be initialized from 2D to 1D, it is needed to control the drive apparatus to move (2D−1D)/0.01 D=100 times. In this step, the movement is not limited to 0.01 D units, or the drive apparatus may be directly controlled to move to a distance matching with the initial vision at one time.

At step S13, according to the monitored eye state of the user, the drive apparatus is controlled to adjust the imaging lens in the imaging system to adjust the position of the imaging surface of the imaging system.

The step S13 includes that the vision evaluation program receives the electrical signal, determines the eye state according to the electrical signal, and adjusts the imaging surface position of the imaging system according to the eye state.

Adjusting the imaging surface position of the imaging system according to the eye state includes that the vision evaluation program controls the drive apparatus to adjust the object distance using a preset myopia diopter as an unit according to the monitored eye state of the user.

In step S13, the vision evaluation program detects the logic value received by the control apparatus from the comparison apparatus, and determines squinting if the logic value is 1, and determines eye opening if the logic value is 0. Monitoring of eye opening or squinting is performed by the light emitter, photoelectric conversion device, comparison apparatus and control apparatus described in the above embodiments, and will not be repeated herein with reference to the description of the above embodiments.

In an embodiment of the present disclosure, the preset myopia diopter may be but is not limited to 0.01 D, and the optical relationship between myopia diopter and object distance is referred to above and will not be repeated here.

In an embodiment of the present disclosure, taking the imaging system shown in FIG. 15a-FIG. 15c as an example, when the monitored user is always in an eye-open state, it is determined that the upper limit of the user's eye use has not been reached, and the drive apparatus is continuously controlled to move the second imaging lens L2 in a unit of a preset myopia diopter; and when squinting of the user is detected, it is determined that the upper limit of user's eye use has been reached, and the drive apparatus is controlled to stop the movement for the second imaging lens L2. As shown in FIG. 15a-FIG. 15c, assuming that the initial position of the object distance M is M2 (as shown in FIG. 15c), the vision evaluation program controls the drive apparatus to adjust the position of the imaging lens L2 so that the object distance M gradually decreases, and when the value of the object distance M is M1 (as shown in FIG. 15a), when the eye state of the user is detected to be squinting, the movement for the second imaging lens L2 is stopped.

For example, if the visual acuity after initialization is 3D and the corresponding object distance M is 5.6 mm (M2 in FIG. 15), the drive apparatus is controlled to reduce the object distance M in units of myopia diopter 0.01 D as long as it is detected that the user does not squint, and once it is detected that the user squints, the drive apparatus is controlled to stop moving the second imaging lens L2. For example, if it is detected that the number of movements is 200 times when the user squints, the corresponding diopter is 1D and the corresponding object distance M is 4.0 mm (M1 in FIG. 15).

Optionally, in an embodiment of the present disclosure, after the drive apparatus is controlled to stop the movement for the two imaging lenses L2, it includes that the movement number is sent to the adjustment program of the distance adjustment strategy.

In an embodiment of the present disclosure, the movement times recorded by the visual evaluation program are the upper limit times of the user's eyes use, for example, the initialization object distance is 5.6 mm, and the corresponding diopter is 3D; after moving for 200 times, the upper limit of eye use is monitored, which can be understood as the result of user visual evaluation, and the corresponding object distance is 4 mm and the corresponding diopter is 1D.

Optionally, after the above step S13, the method includes that the adjustment program of the distance adjustment strategy executes the strategy adjustment according to the number of movements from the vision evaluation program.

Among them, the strategy adjustment described above according to the position of the adjusted imaging surface includes: the adjustment program of the distance adjustment strategy executes the strategy adjustment according to the movement times from the vision evaluation program.

In an embodiment of the present disclosure, when the distance adjustment program executes the policy adjustment, the adjustment is based on initial object distance, movement times and the adjustment relationship among object distance M, screen picture distance, myopia diopter in the above table 3. For example, when the number of movement times is 200, the distance adjustment program determines that the myopia diopter corresponding to the user's vision evaluation result is 1D according to the initial vision 3D and the number of movements times 200, and then makes strategy adjustment according to the myopia diopter 1D. When performing the strategy adjustment according to the myopia diopter corresponding to the user's vision evaluation result, the object distance may be adjusted according to the preset period (that is, the imaging surface position may be adjusted according to the preset period). For example, the adjustment strategy corresponding to myopia diopter 1D is that the preset period is 30 minutes, wherein the screen distance is adjusted to 800 mm by adjusting the object distance in 10 minutes, the surface screen distance is adjusted to 400 mm by adjusting the object distance in the next ten minutes, and the screen distance is adjusted to 600 mm in the next ten minutes. The screen distance is adjusted to 800 mm at the beginning of the second cycle, and so on and so forth.

Optionally, the adjustment program of the distance strategy adjustment in the embodiment of the present disclosure is nested in the original object distance adjustment program in the form of a sub-function, and an offset is applied to the distance adjustment function in the main function according to the movement times returned by the vision evaluation program.

Steps S11-S13 shown in FIG. 20 can be understood as performing vision evaluation according to the monitored squinting or eye opening state, and finally obtaining a user vision evaluation result. Subsequently, the distance adjustment program executes strategy adjustment according to the vision evaluation result, and performs real-time and automatic vision correction according to the adjusted correction strategy. Since both the timing register and the vision evaluation apparatus are provided in the control apparatus, the main body for executing steps S11 to S13 can be understood to be executed by the control apparatus. The adjusted correction strategy may include adjusting the position of the imaging surface according to the vision evaluation result according to a preset period, and adjusting the position of the imaging surface according to a preset distance within the preset period. For example, the preset period is 30 minutes or 10 minutes, and the position of the imaging surface may be adjusted by adjusting the position of the imaging lens in the imaging system. If it is a VA or AR eye protection instruments, the screen picture distance is also adjusted while adjusting the position of the imaging lens. For example, by adjusting the position of the imaging lens, the preset period is 30 minutes, and the screen picture distance in one period is 300 m in 10 minutes, 800 m in 10 minutes and 600 m in 10 minutes respectively.

In the embodiment of the present disclosure, when a distance adjustment program executes strategy adjustment according to a vision evaluation result and corrects according to the adjusted correction strategy, a vision evaluation program may be triggered to perform vision evaluation when the eye state of a user is monitored to be a squinting state, and after a new vision evaluation result is obtained by the vision evaluation program, the distance adjustment program performs vision correction according to the strategy adjustment corresponding to the new vision evaluation result.

It should be noted that the distance adjustment program have adjustment strategies corresponding to all the vision evaluation results obtained by the distance adjustment program, and the correction adjustment strategy may be set according to the actual situation, which is not limited here.

Figure 21:
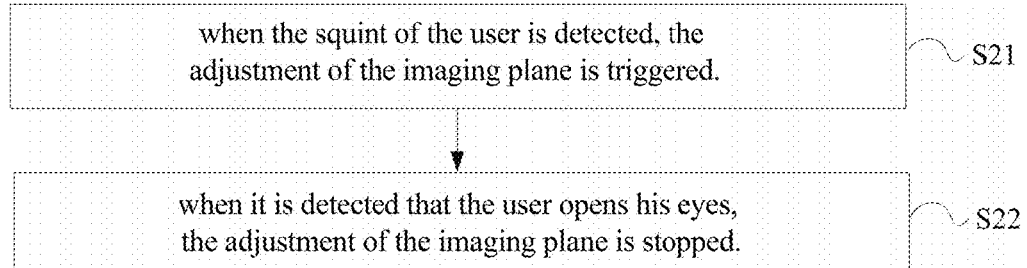
FIG. 21 is a flowchart of another imaging adjustment method provided by an embodiment of the present disclosure.

In some embodiments, the adjustment method of imaging surface of the present disclosure may be applied to real-time monitoring of user vision, as shown in FIG. 21, including:

In step S21, when the squint of the user is detected, the adjustment for the imaging surface is triggered. Step S21 may include the control apparatus receives a high level of the comparison apparatus or receives an electrical signal higher than the first preset electrical signal, and then the control drive apparatus drives the imaging lens in the optical system to adjust the optical path.

For example, the first preset electrical signal is 680 mV. Adjust the optical path, such as adjusting the relationship between the object distance between the imaging lens and the screen and the myopia diopter, such as moving the imaging lens in the optical system in units of 0.01 d.

When the imaging lens is driven to adjust the optical path (i.e. the position of the imaging surface of the imaging system is adjusted) in step S21, the number of times in which the imaging lens is moved is also recorded.

At Step S22, when it is detected that the user opens his eyes, the adjustment for the imaging surface is stopped.

Step S22 may include the control apparatus receives a low level of the comparison apparatus or receives an electrical signal lower than the second preset electrical signal, then the control drive apparatus stops driving the imaging lens in the optical system.

If the myopia diopter before triggering the adjustment of the imaging surface is 1D, the corresponding object distance is 4.0 mm, and the adjustment is stopped after moving for 100 times, referring to Table 2, and the adjusted myopia diopter is 2D, the corresponding object distance is 4.8 mm.

After the step S22, correction can be performed according to the correction strategy corresponding to the eye diopter when the imaging surface adjustment is stopped. If vision correction is performed according to the correction strategy corresponding to the myopia diopter 2D, it may include adjusting the screen picture distance according to the period corresponding to the myopia diopter 2D.

In an embodiment of the present disclosure, the screen picture distance may correspond to the myopia diopter and the object distance, and the correspondence is shown with reference to Table 3.

In an embodiment of the present disclosure, the correction strategy is executed, the eyes can be better protected on the basis of comfortable use, and the screen picture distance may be set according to the preset period, for example, the preset period is 40 minutes, wherein the screen picture distance is 500 mm in 10 minutes, the screen picture distance is 1000 mm in the next 10 minutes, the screen picture distance is 1500 mm in the next 10 minutes, and the screen picture distance in the next 10 minutes is 1000 mm respectively.

An embodiment of the present disclosure further provide a non-transient computer-readable storage medium configured to store computer program instructions, wherein, when the computer program instructions are operated, the imaging adjustment method of any one of the above may be implemented.

Embodiments of the present discloses an imaging adjustment apparatus and method, a wearable device and a storage medium, in which an electrical signal is generated through photoelectric conversion based on a second light reflected by a user's eye, an eye state is determined according to the electrical signal, and an imaging surface of an imaging system formed by an optical system and an eye is adjusted according to the eye state; The position of the imaging surface of the optical system may be adjusted by the action of squinting and opening eyes of the user, so that the vision of the user may be monitored and corrected in time and automatically, so as to adjust the imaging position in time and automatically according to the monitoring results, and to improve comfort of the user.

It may be understood by those of ordinary skills in the art that all or some acts in a method and function modules/units in a system and an apparatus disclosed above may be implemented as software, firmware, hardware, and appropriate combinations thereof. In a hardware implementation, division of the function modules/units mentioned in the above description is not always corresponding to division of physical components. For example, a physical component may have multiple functions, or a function or an act may be executed by several physical components in cooperation. Some components or all components may be implemented as software executed by a processor such as a digital signal processor or a microprocessor, or implemented as hardware, or implemented as an integrated circuit such as an specific integrated circuit. Such software may be distributed in a computer-readable medium, and the computer-readable medium may include a computer storage medium (or a non-transitory medium) and a communication medium (or a transitory medium). As known to those of ordinary skills in the art, the term computer storage medium includes volatile and nonvolatile, and removable and irremovable media implemented in any method or technology for storing information (for example, a computer-readable instruction, a data structure, a program module, or other data). The computer storage medium includes, but not limited to, RAM, ROM, EEPROM, a flash memory or another memory technology, CD-ROM, a digital versatile disk (DVD) or another optical disk storage, a magnetic cassette, a magnetic tape, a magnetic disk storage, or another magnetic storage apparatus, or any other medium that may be configured to store desired information and may be accessed by a computer. In addition, it is known to those of ordinary skills in the art that the communication medium usually includes a computer-readable instruction, a data structure, a program module, or other data in a modulated data signal of, such as, a carrier or another transmission mechanism, and may include any information delivery medium.

The drawings of the embodiments of the present disclosure only involve structures involved in the embodiments of the present disclosure, and for other structures, reference may be made to usual designs.

The embodiments of the present disclosure, i.e., features in the embodiments, may be combined with each other to obtain new embodiments if there is no conflict.

Although the implementations disclosed in the embodiments of the present disclosure are described above, the described contents are only implementations used for facilitating understanding of the embodiments of the present disclosure, which are not intended to limit the embodiments of the present disclosure. Any person skilled in the art to which the embodiments of the present disclosure pertain may make any modifications and variations in forms and details of implementation without departing from the spirit and scope disclosed in the embodiments of the present disclosure. Nevertheless, the scope of patent protection of the embodiments of the present disclosure shall still be subject to the scope defined by the appended claims.

The invention claimed is:

1. An imaging adjustment apparatus, comprising a light emitting device, a photoelectric conversion device, a control apparatus, and a drive apparatus and a comparison apparatus, wherein:

a first light is emitted by the light emitting device to allow the first light to irradiate an eye of a user in a case that the user wears a wearable device;

a photoelectric conversion is performed by the photoelectric conversion device to generate an electrical signal based on a second light reflected by the eye of the user, and the electrical signal is supplied by the photoelectric conversion device to the control apparatus, wherein the second light is formed by a reflection of the first light;

an eye state of the user is determined by the control apparatus based on the electrical signal, and the drive apparatus is controlled by the control apparatus according to the eye state of the user;

a position of an imaging surface of an imaging system is adjusted by the drive apparatus under control of the control apparatus;

the electrical signal is supplied by the photoelectric conversion device to the comparison apparatus;

the electric signal generated by the photoelectric conversion device is compared by the comparison apparatus with a preset electrical signal, a comparison result signal is generated by the comparison apparatus, and the comparison result signal is sent by the comparison apparatus to the control apparatus; and the drive apparatus is controlled by the control apparatus according to the comparison result signal.

2. The imaging adjustment apparatus according to claim 1, further comprising a filtering apparatus, wherein the filtering apparatus is connected with the photoelectric conversion device and the signal amplifying apparatus, and the electrical signal generated by the photoelectric conversion device is filtered by the filtering apparatus.

3. The imaging adjustment apparatus according to claim 1, wherein the photoelectric conversion device comprises a photosensitive triode and a signal conversion resistor, and wherein a collector of the photosensitive triode is connected to the signal conversion resistor, and a connection node between the photosensitive triode and the signal conversion resistor serves as an output end of the photoelectric conversion device.

4. The imaging adjustment apparatus according to claim 1, wherein the drive apparatus comprises an object distance adjustment motor; and wherein a position of an imaging lens in an optical system is adjusted by the object distance adjustment motor under control of the control apparatus.

5. A wearable device, comprising an optical system and the imaging adjustment apparatus according to claim 1, wherein an imaging surface of an imaging system formed by an optical system and the user's eye is adjusted by the imaging adjustment apparatus.

6. The wearable device according to claim 5, further comprising a screen, wherein a display surface of the screen is oriented towards the optical system.

7. The wearable device according to claim 6, wherein:

the optical system comprises a first imaging lens and a second imaging lens;

the first imaging lens is located between the eye and the second imaging lens;

the second imaging lens is located between the first imaging lens and the screen; and a position of the first imaging lens or the second imaging lens is adjusted by the imaging adjustment apparatus, and the position of the imaging surface of the imaging system formed by the optical system and the eye is adjusted.

8. The imaging adjustment apparatus according to claim 1, wherein a wavelength of the first light emitted by the light emitting device is within a spectral response range of the photoelectric conversion device.

9. The imaging adjustment apparatus according to claim 1, wherein the light emitting device and the photoelectric conversion device are disposed on a side of the imaging system and do not block an optical path of the imaging system.

10. The imaging adjustment apparatus according to claim 2, further comprising a signal amplifying apparatus, wherein the signal amplifying apparatus is connected with the filtering apparatus and the comparison apparatus, and the filtered signal is amplified by the signal amplifying apparatus and an amplified signal is supplied by the signal amplifying apparatus to the comparison apparatus.

11. The imaging adjustment apparatus according to claim 2, wherein the photoelectric conversion device comprises a photosensitive triode and a signal conversion resistor; and wherein a collector of the photosensitive triode is connected to the signal conversion resistor, and a connection node between the photosensitive triode and the signal conversion resistor serves as an output end of the photoelectric conversion device.

12. An imaging adjustment method, comprising:

emitting a first light to irradiate an eye of a user in a case that the user wears a wearable device;

determining an eye state of the user based on an electric signal generated after photoelectric conversion of a second light, wherein the second light is the light reflected by the eye of the user after a first light irradiates the eye of the user;

adjusting a position of an imaging surface of an imaging system according to the eye state of the user; and setting an initial position of the imaging surface of the imaging system, wherein the initial position is a position matched with an initial vision of the user.

13. The imaging adjustment method according to claim 12, wherein the eye state of the user comprises a user squinting state, a user eye opening state, and a user vision evaluation result.

14. The imaging adjustment method according to claim 13, after adjusting the position of the imaging surface of the imaging system according to the eye state of the user, further comprising:

adjusting the position of the imaging surface based on a preset period according to the vision evaluation result.

15. The imaging adjustment method according to claim 12, wherein setting the initial position of the imaging surface of the imaging system comprises setting the initial position of the imaging surface of the imaging system based on a determination that a trigger condition is met, wherein the trigger condition comprises one or more of the following:

a use duration is longer than or equal to a preset adjustment period;

a time interval from a last adjustment is greater than or equal to N times of the preset adjustment period, where N≥1; and the determined eye state is a preset eye state.

16. The imaging adjustment method according to claim 12, wherein the optical system comprises a first imaging lens and a second imaging lens; the imaging system further comprises a screen, wherein the first imaging lens is located between the screen and the user's eye, and the second imaging lens is located between the first imaging lens and the screen; and wherein adjusting the position of the imaging surface of the imaging system comprises:

adjusting a distance between the second imaging lens and the screen.

17. A non-transitory computer-readable storage medium, configured to store computer program instructions, wherein when the computer program instructions are run, the imaging adjustment method according to claim 12 is implemented.

\* \* \* \* \*